(12) United States Patent
Kuno et al.

(10) Patent No.: US 9,363,089 B2
(45) Date of Patent: Jun. 7, 2016

(54) INFORMATION PROCESSING APPARATUS, INFORMATION STORAGE APPARATUS, INFORMATION PROCESSING SYSTEM, AND INFORMATION PROCESSING METHOD AND PROGRAM FOR CONTROLLING CONTENT USE

(71) Applicant: SONY CORPORATION, Minato-ku (JP)

(72) Inventors: Hiroshi Kuno, Kanagawa (JP); Takamichi Hayashi, Tokyo (JP); Koji Yoshimura, Kanagawa (JP); Katsumi Muramatsu, Tokyo (JP); Yoshiyuki Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 191 days.

(21) Appl. No.: 14/060,986

(22) Filed: Oct. 23, 2013

(65) Prior Publication Data

US 2014/0122887 A1    May 1, 2014

(30) Foreign Application Priority Data

Oct. 26, 2012  (JP) ................................ 2012-236258

(51) Int. Cl.
*H04L 9/32* (2006.01)

(52) U.S. Cl.
CPC ........... *H04L 9/3271* (2013.01); *H04L 2209/60* (2013.01)

(58) Field of Classification Search
None
See application file for complete search history.

(56) References Cited

U.S. PATENT DOCUMENTS

| 2004/0078586 | A1* | 4/2004 | Sato ........................ G06F 21/10 713/193 |
| 2005/0120246 | A1* | 6/2005 | Jang ..................... H04L 12/2807 726/4 |
| 2008/0034444 | A1* | 2/2008 | Sears ....................... A63F 13/12 726/29 |
| 2008/0247731 | A1* | 10/2008 | Yamauchi ............... G06F 21/10 386/259 |
| 2009/0287922 | A1* | 11/2009 | Herwono .............. H04L 9/0822 713/155 |
| 2011/0320811 | A1* | 12/2011 | Ueda ................ G11B 20/00086 713/158 |
| 2013/0080769 | A1* | 3/2013 | Cha ........................ H04L 63/168 713/155 |

* cited by examiner

*Primary Examiner* — Lisa Lewis
*Assistant Examiner* — Henry Tsang
(74) *Attorney, Agent, or Firm* — Chip Law Group

(57) ABSTRACT

There is provided an information processing apparatus including: a data processing unit, on which a medium as an information storage apparatus is mounted, which controls reproduction of content stored on the medium, wherein the data processing unit executes host device ID registration processing for outputting a host device ID, which is an identifier of the host device, to the medium and storing the host device ID on the medium, receives the host device ID, which is stored on the medium, from the medium after execution of the host device ID registration processing, executes connection consistency confirmation processing for executing matching processing between the received host ID and the host device ID of the host device, and executes or continues content reproduction under a condition that the matching processing has been established in the connection consistency confirmation processing, or stops the content reproduction if the matching processing has not been established.

20 Claims, 20 Drawing Sheets

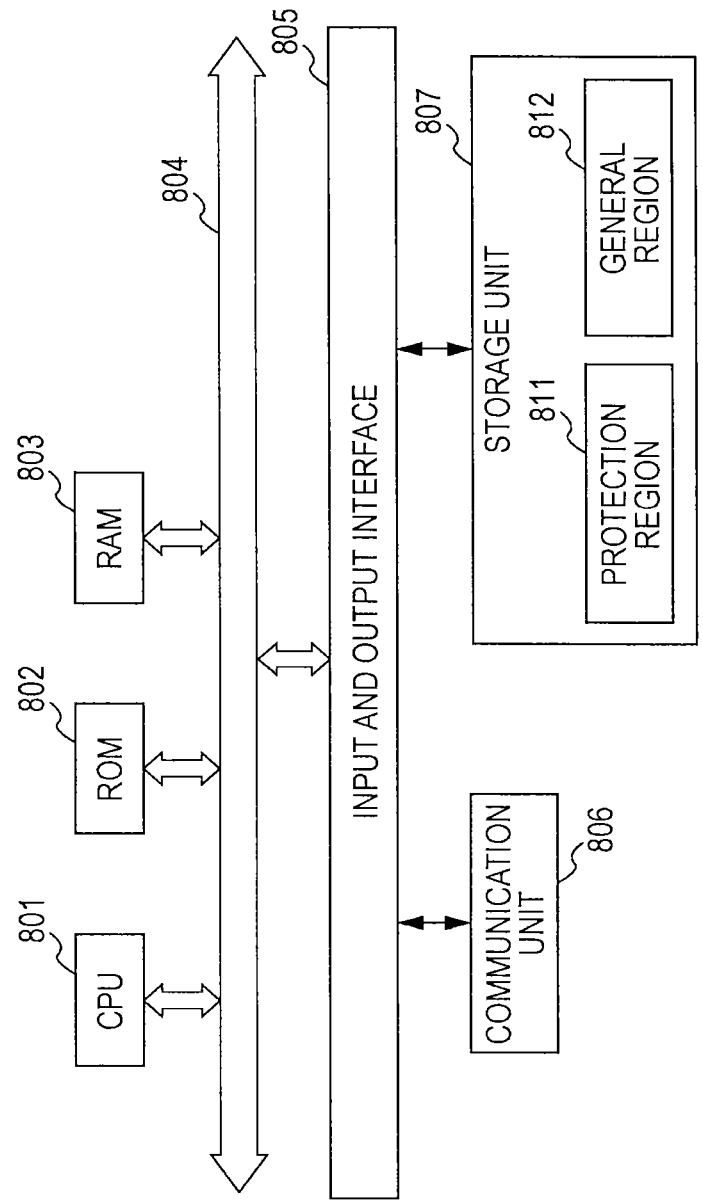

INFORMATION PROCESSING APPARATUS, INFORMATION STORAGE APPARATUS, INFORMATION PROCESSING SYSTEM, AND INFORMATION PROCESSING METHOD AND PROGRAM FOR CONTROLLING CONTENT USE

CROSS REFERENCE TO RELATED APPLICATIONS

This application claims the benefit of Japanese Priority Patent Application JP 2012-236258 filed Oct. 26, 2012, the entire contents of which are incorporated herein by reference.

BACKGROUND

The present disclosure relates to an information processing apparatus, an information storage apparatus, an information processing system, and information processing method and program. Particularly, the present disclosure relates to an information processing apparatus, an information storage apparatus, an information processing system, and information processing method and program which control content use.

For example, movie and music content is provided to users via various media such as a Digital Versatile Disc (DVD), a Blu-ray Disc (registered trademark), or a flash memory, a network such as the Internet, or a broadcast wave. The users can reproduce the content by using recording and reproducing apparatuses such as a PC, a mobile terminal, and a BD player or various information processing apparatuses such as a television.

Copyrights, distribution rights, and the like of such content of music data, image data, and the like to be provided to users are typically reserved by creators or sellers thereof in many cases. Therefore, content providers perform predetermined content use control in many cases for providing the content to users.

A digital recording apparatus and a recording medium can repeat recording and reproducing without degrading an image and sound, for example, and there are problems that distribution of improperly copied content via the Internet and use of improperly copied content have been rampant.

As a specific configuration for preventing such improper use of content, content encryption processing has been proposed. According to the configuration, content to be provided to users is encrypted, and only authorized users can acquire an encryption key. Such processing is disclosed in Japanese Unexamined Patent Application Publication No. 2008-98765, for example.

The encryption key used for decoding the encrypted data is recorded in a medium such as a memory card owned by a user along with the encrypted content when the user purchases the encrypted content, for example, when the user downloads the encrypted content.

A reproducing apparatus on which the memory card is mounted can reproduce the content by reading the encrypted content and the encryption key from the memory card and decoding the encrypted content by applying the encryption key in reproducing the content.

As described above, so-called medium-bind type content uses control in which content is associated with one medium is realized by recording the encrypted content and the encryption key as one data set in a medium such as a memory card.

Such medium-bind type content can be reproduced by various reproducing apparatuses on which the medium can be mounted.

In recent years, content acquiring processing is performed by content downloading processing via a network. Users store downloaded content on a medium such as a memory card and mount the medium on various reproducing apparatuses to read and reproduce the content from the medium.

Although there are various content storage media, removable media such as a USB memory and an SD card have been frequently used in recent years. Such media are small sized and have an advantage that the media can be attached to and detached from various reproducing devices. For example, users can reproduce content by using various reproducing devices such as a mobile reproducing device and a stationary reproducing device in accordance with use conditions.

When a user reproduces content by using a medium such as a USB memory or an SD card, the user sets the media, on which the content is stored, in a media interface (I/F) of a host device which is a reproducing apparatus and causes the host device to execute a reproducing application thereof. By such processing, it is possible to reproduce and use various kinds of content stored in media.

When a medium such as a USB memory or an SD card is used, it is necessary to mount the medium on a medium interface of a host device which is a reproducing apparatus, namely on a USB interface (USB I/F), an SD interface (SD I/F), or the like.

Such a medium interface is configured in compliance with a predetermined physical standard. According to the physical standard, a medium is configured to be able to transfer data only to one host device at the same time. That is, a medium is set so as not to be able to transfer data to a plurality of host devices in parallel.

Accordingly, content recorded in a medium 10 is allowed to be reproduced only by a host device 30 which is connected to the medium as shown in FIG. 1A.

That is, a situation that the content stored on the single medium 10 is output by two or more host devices in parallel and the plurality of host devices reproduce the same content at the same time does not occur.

However, there is a possibility that processing of receiving and reproducing the content stored on the medium 10 via a network from a server 30, on which the single content storage medium 10 is mounted, may be performed by processing of modifying media drivers of a plurality of host devices 30-1 to 30-$n$ and mounting dummy media 31-1 to 31-$n$ on the medium interfaces as shown in FIG. 1B.

If the processing as shown in FIG. 1B is performed, the plurality of host devices, namely n host devices 30-1 to 30-$n$ shown in FIG. 1B can reproduce a single piece of content stored on the single medium 10 at the same time in parallel.

The content use configuration shown in FIG. 1B is a configuration which may enable an indefinite number of users who did not legally purchase content to use the single piece of purchased content. If content is used as described above, the content stored on the medium 10 is chaotically reproduced and used by an indefinite number of users. As a result, copyrights and distribution rights of content are infringed, and interests of persons who legally hold the rights are improperly harmed.

SUMMARY

It is desirable to provide an information processing apparatus, an information storage apparatus, an information processing system, and information processing method and program which realize content use control such that a single piece of content stored on a medium can be used only by a host device within a predetermined permitted limit, such as a single host device (information processing apparatus), for example.

According to a first embodiment of the present disclosure, there is provided an information processing apparatus including: a data processing unit, on which a medium as an information storage apparatus is mounted, which controls reproduction of content stored on the medium, wherein the data processing unit executes host device ID registration processing for outputting a host device ID, which is an identifier of the host device itself, to the medium and storing the host device ID on the medium, receives the host device ID, which is stored on the medium, from the medium after execution of the host device ID registration processing, executes connection consistency confirmation processing for executing matching processing between the received host ID and the host device ID of the host device itself, and executes or continues content reproduction under a condition that the matching processing has been established in the connection consistency confirmation processing, or stops the content reproduction if the matching processing has not been established.

In the information processing apparatus according to the embodiment of the present disclosure, the data processing unit may generate a random number and transmit the random number to the medium in the connection consistency confirmation processing, receive the random number and a verification value for data including the host device ID, which has been stored on the medium, from the medium, confirm validity of received data from the medium based on the verification value, and then execute the matching processing.

Furthermore, in the information processing apparatus according to the embodiment of the present disclosure, the verification value received from the medium may be a Message Authentication Code (MAC), to which a session key (Bk) shared in authentication processing between the information processing apparatus and the medium is applied, and the data processing unit may calculate the generated random number and the MAC for the data which includes the host device ID received from the medium by applying the session key (Bk), determine whether or not the calculated MAC coincides with the MAC received from the medium, and confirm validity of the data received from the medium.

Furthermore, in the information processing apparatus according to the embodiment of the present disclosure, the data processing unit may repeatedly execute the connection consistency confirmation processing during a period of reproducing the content stored on the medium, and continue the content reproduction under a condition that the matching processing has been established, or stops the content reproduction if the matching processing has not been established.

Furthermore, in the information processing apparatus according to the embodiment of the present disclosure, the data processing unit may transmit a host device ID acquired from the device itself and a verification value generated based on the host device ID to the medium in the host device ID registration processing.

Furthermore, in the information processing apparatus according to the embodiment of the present disclosure, the verification value may be a Message Authentication Code (MAC), to which a session key (Bk) shared in authentication processing between the information processing apparatus and the medium is applied.

Furthermore, in the information processing apparatus according to the embodiment of the present disclosure, the data processing unit may execute authentication processing with the medium, establish an authentication session under a condition that the authentication processing and session key (Bk) sharing processing have been successfully performed, and then execute the host device ID registration processing or the connection consistency confirmation processing.

According to a second embodiment of the present disclosure, there is provided an information storage apparatus including: a storage unit which stores content thereon; and a data processing unit which executes data processing on data received from and transmitted to a host device reproducing the content, wherein the data processing unit executes host device ID registration processing for inputting a host device ID, which is an identifier of the host device, from the host device, storing the host device ID on the storage unit, and registering the host device as an content reproduction permitted device, and after the execution of the host device ID registration processing, executes connection consistency confirmation processing for generating a verification value for data, which includes the host device ID stored on the storage unit, and transmitting the generated verification value and the host device ID to the host device.

Furthermore, in the information storage apparatus according to the embodiment of the present disclosure, the data processing unit may receive a random number from the host device and generate a verification value for the data which includes the received random number and the host device ID in the connection consistency confirmation processing.

Furthermore, in the information storage apparatus according to the embodiment of the present disclosure, the data processing unit may receive the host device ID and the verification value generated based on the host device ID from the host device, execute validity confirmation processing by applying the received verification value to the received host device ID, and store the received host device ID on the storage unit under a condition that validity of the received host device ID has been confirmed, in the connection consistency confirmation processing.

Furthermore, in the information storage apparatus according to the embodiment of the present disclosure, the verification value may be a Message Authentication Code (MAC), to which a session key (Bk) shared in authentication processing between the information storage apparatus and the host device is applied.

Furthermore, in the information storage apparatus according to the embodiment of the present disclosure, the verification value generated in the connection consistency confirmation processing may be a Message Authentication Code (MAC), to which a session key (Bk) shared in authentication processing between the host device and the information storage apparatus is applied, and the data processing unit may calculate a MAC for data, which includes the host device ID stored on the storage unit, by applying the session key (Bk) and transmits the MAC to the host device.

Furthermore, in the information storage apparatus according to the embodiment of the present disclosure, the data processing unit may repeatedly execute the connection consistency confirmation processing during a period of reproducing the content by the host device.

Furthermore, in the information storage apparatus according to the embodiment of the present disclosure, the data processing unit may execute authentication processing with the host device, establish an authentication session under a condition that the authentication processing and session key (Bk) sharing processing have been successfully performed, and then execute the host device ID registration processing or the connection consistency confirmation processing.

Furthermore, in the information storage apparatus according to the embodiment of the present disclosure, the data processing unit may execute deregistration processing for deleting the host device ID, which has been stored on the storage unit, in response to reception of a deregistration request from the host device.

According to a third embodiment of the present disclosure, there is provided an information processing system including: a medium which stores content thereon; and a host device which reproduces the content, wherein the system executes host device ID registration processing in which the host device outputs a host device ID as an identifier of the host device itself to the medium and the medium stores the received host device ID on a storage unit and registers the host device as a content reproduction permitted device, executes connection consistency confirmation processing, in which the medium transmits the host device ID stored on the medium to the host device and the host device executes matching processing between the host device ID received from the medium and the host device ID maintained by the host device, after execution of the host device ID registration processing, and causes the host device to execute or continue content reproduction under a condition that the matching processing has been established in the connection consistency confirmation processing, or causes the host device to stop the content reproduction if the matching processing has not been established.

According to a fourth embodiment of the present disclosure, there is provided an information processing method which is executed by an information processing apparatus, the information processing apparatus including a data processing unit, on which a medium as an information storage apparatus is mounted, which controls reproduction of content stored on the medium, the method including: causing the data processing unit to execute host device ID registration processing for outputting a host device ID, which is an identifier of the host device itself, to the medium and storing the host device ID on the medium; causing the data processing unit to execute connection consistency confirmation processing for receiving the host device ID stored on the medium from the medium and executing matching processing between the received host device ID and the host device ID of the host device itself after execution of the host device ID registration processing; and causing the data processing unit to execute or continue content reproduction under a condition that the matching processing has been established in the connection consistency confirmation processing, or stop the content reproduction if the matching processing has not been established.

According to a fifth embodiment of the present disclosure, there is provided an information processing method which is executed by an information storage apparatus, the information storage apparatus including a storage unit which stores content thereon and a data processing unit which executes data processing on data received from and transmitted to a host device reproducing the content, the method including: causing the data processing unit to execute host device ID registration processing for inputting a host device ID, which is an identifier of the host device, from the host device, storing the host device ID on the storage unit, and registering the host device as a content reproduction permitted device; and causing the data processing unit to execute connection consistency confirmation processing for generating a verification value on data which includes the host device ID stored on the storage unit and transmitting the generated verification value and the host device ID stored on the storage unit to the host device after execution of the host device ID registration processing.

According to a sixth embodiment of the present disclosure, there is provided a program which causes an information processing apparatus to execute information processing, the information processing apparatus including a data processing unit, on which a medium as an information storage apparatus is mounted, which controls reproduction of content stored on the medium, the information processing including: causing the data processing unit to execute host device ID registration processing for outputting a host device ID, which is an identifier of the host device itself, to the medium and storing the host device ID on the medium; causing the data processing unit to execute connection consistency confirmation processing for receiving the host device ID stored on the medium from the medium and executing matching processing between the received host device ID and the host device ID of the host device itself after execution of the host device ID registration processing; and causing the data processing unit to execute or continue content reproduction under a condition that the matching processing has been established in the connection consistency confirmation processing, or stop the content reproduction if the matching processing has not been established.

According to a seventh embodiment of the present disclosure, there is provided a program which causes an information storage apparatus to execute information processing, the information storage apparatus including a storage unit which stores content thereon and a data processing unit which executes data processing on data received from and transmitted to a host device reproducing the content, the information processing including: causing the data processing unit to execute host device ID registration processing for inputting a host device ID, which is an identifier of the host device, from the host device, storing the host device ID on the storage unit, and registering the host device as a content reproduction permitted device; and causing the data processing unit to execute connection consistency confirmation processing for generating a verification value on data which includes the host device ID stored on the storage unit and transmitting the generated verification value and the host device ID stored on the storage unit to the host device after execution of the host device ID registration processing.

In addition, the program according to the present disclosure is a program which can be provided to an information processing apparatus or a computer system capable of executing various program codes via a storage medium or a communication medium which provides the program in a computer readable format. By providing such a program in a computer readable format, it is possible to implement the processing in accordance with the program on the information processing apparatus or the computer system.

Other purposes, features, and advantages of the present disclosure will be clarified by detailed description based on embodiments of the present disclosure described below and accompanying drawings. In addition, a system described herein is a logical group configuration of a plurality of apparatuses and is not limited to the apparatuses with respective configurations in the same case body.

According to the configuration of the embodiments of the present disclosure, content use control, by which only specific host devices registered in the medium are permitted to reproduce content from the medium, is realized.

Specifically, the host device outputs the host device ID, which is an identifier of the host device itself, to the medium, and the medium stores the host device ID on the storage unit and registers the host device as the content reproduction permitted device. Furthermore, the medium transmits the host device ID stored on the medium to the host device, and the host device executes matching processing between the host device ID received from the medium and the host device ID maintained in the host device. The host device executes the reception of the host device ID from the medium and the matching processing during a period of reproducing the content, and continues the content reproduction under the condition that the matching processing has been established, or stops the content reproduction if the matching processing has not been established.

With such a configuration, content use control, by which only specific host devices registered in the medium are permitted to reproduce content from the medium, is realized.

BRIEF DESCRIPTION OF THE DRAWINGS

FIG. 20 is a diagram illustrating a hardware configuration example of the medium (information storage apparatus).

DETAILED DESCRIPTION OF EMBODIMENTS

Figure 1A:
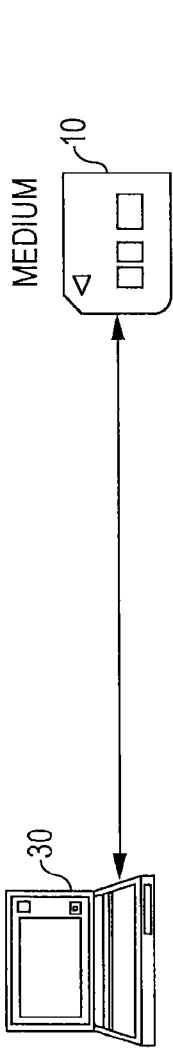
FIGS. 1A and 1B are diagrams illustrating a problem in processing of reproducing content from a medium.
Figure 1B:
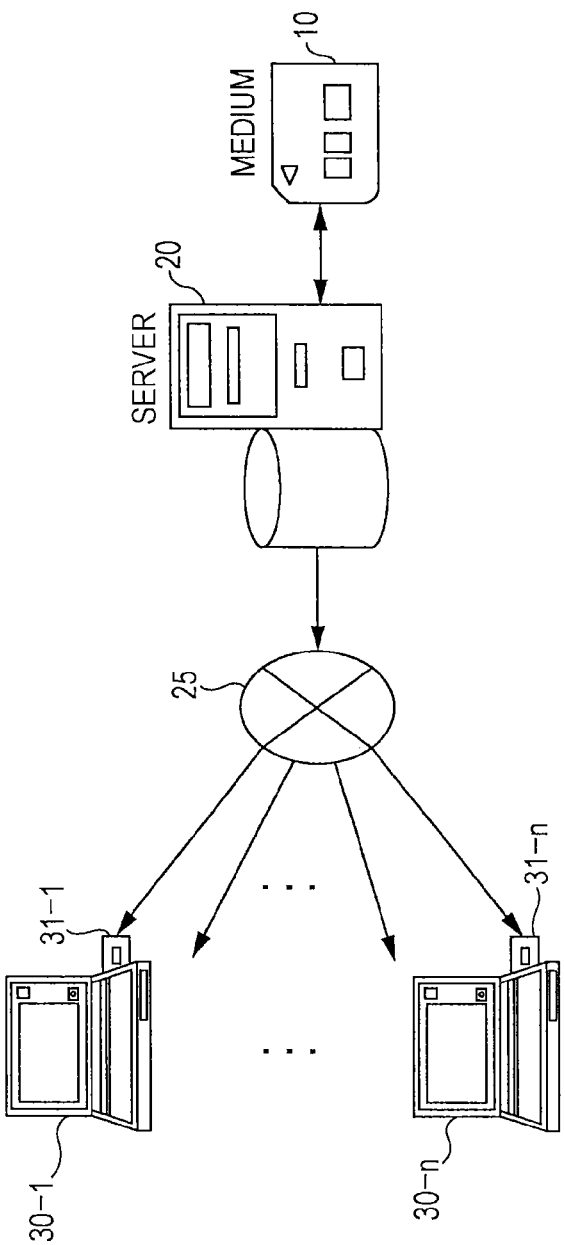

Hereinafter, a detailed description will be given of an information processing apparatus, an information storage apparatus, an information processing system, and information processing method and program according to the present disclosure with reference to the drawings. In addition, the following items will be described.

1. Concerting specific examples of information processing apparatus and information storage apparatus and outline of content use processing
2. Concerning configuration example of information storage apparatus (medium)
3. Concerting detailed sequence of communication processing between host device and medium in reproducing content
3-1. Concerning processing for registering host device in medium
3-2. Processing for confirming connection consistency between host device and medium
3-3. Processing for deregistering host device which has been registered as reproduction permitted device in medium
4. Concerning details of processing executed by host device
4-1. Processing of registering host device in medium
4-2. Processing of preparing for content reproduction by host device
4-3. Processing for confirming connection consistency between host device and medium
5. Concerning details of processing executed by medium
5-1. Processing of registering host derive in medium
5-2. Processing of confirming connection consistency between host device and medium
5-3. Deregistration processing for deleting ID of host device which has been recorded as content reproduction permitted device in medium
6. Concerning specific application examples of processing according to the present disclosure
6-1. Processing example in which one host device reproduce content by applying a plurality of content reproducing applications
6-2. Processing example when a plurality of host devices attempt to reproduce content from one medium in parallel
6-3. Processing example when a plurality of host devices attempt to reproduce content from one medium in sequential manner
7. Concerning other embodiments
8. Concerning hardware configuration examples of respective apparatuses
9. Overview of configuration according to the present disclosure

1. Concerning Specific Examples of Information Processing Apparatus and Information Storage Apparatus and Outline of Content Use Processing Hereinafter, a description will be given of a configuration of the present disclosure with reference to the drawings.

First, specific examples of an information processing apparatus and an information storage apparatus according to the present disclosure and an outline of content use processing will be described with reference to FIGS. 2A and 2B. The information processing apparatus according to the present disclosure is a host device 100 such as a PC 100a as shown in FIG. 2A or a mobile terminal 100b as shown in FIG. 2B, which is a content reproducing apparatus for reproducing content stored on a medium 200.

Figure 2A:
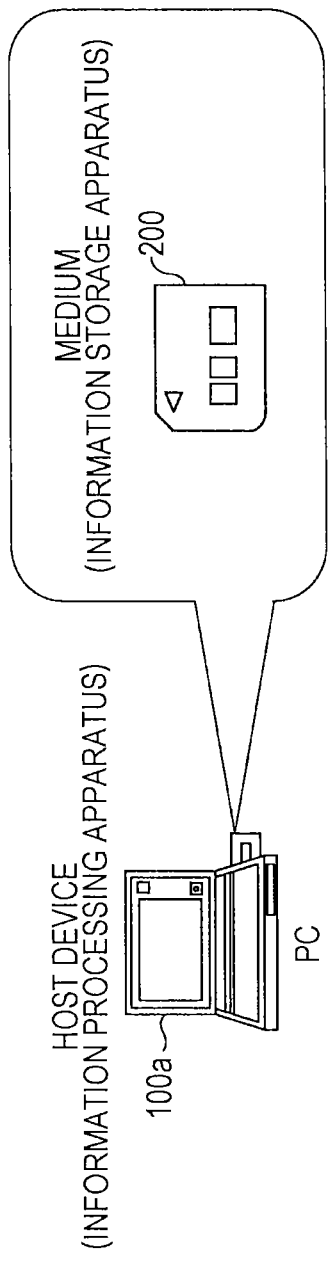
FIGS. 2A and 2B are diagrams illustrating an information processing apparatus which executes processing of reproducing content and a medium, on which content is stored.
Figure 2B:
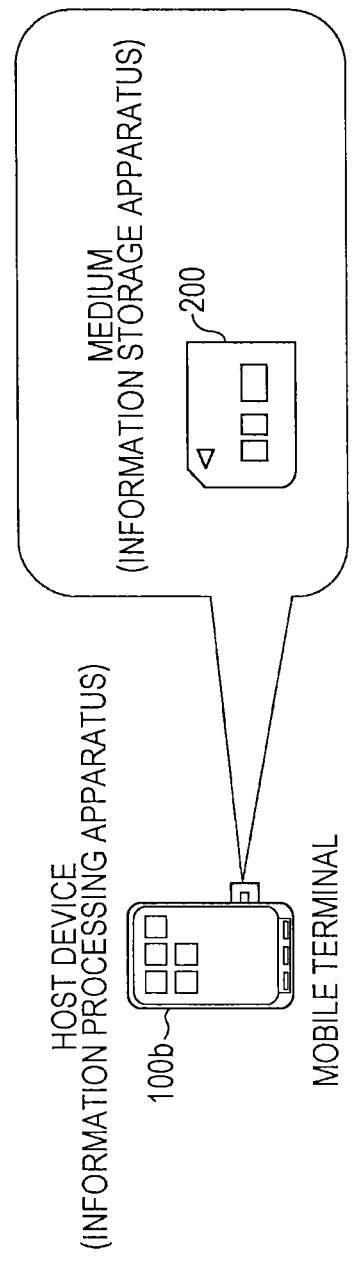

In addition, the information storage apparatus according to the present disclosure is the medium 200 as shown in FIGS. 2A and 2B, for example. Specifically, the medium 200 is a USB memory, an SD card, or the like.

The host device 100 includes a medium interface (I/F), on which the medium 200 is mounted to communicate with the medium, and reads and reproduces content stored on the medium 200 by mounting the medium 200 on the medium interface and executing communication with the medium 200.

In addition, the information processing apparatus according to the present disclosure is not limited to the PC and the mobile terminal as shown in FIGS. 2A and 2B and includes various apparatuses such as a television, a disc player, an audio device, and a game player provided with a medium interface. The information processing apparatus according to the present disclosure reproduces the content stored on the medium which is mounted on the medium interface.

In addition, the content reproduced by the host device 100 which is the information processing apparatus includes various kinds of content such as images including video images and stationary images, music, and games.

2. Concerning Configuration Example of Information Storage Apparatus (Medium)

Next, a description will be given of a configuration example of the medium 200 which is the information storage apparatus to be mounted on the medium interface of the host device 100, namely the medium 200 which stores the content to be reproduced by the host device 100, with reference to FIG. 3.

Figure 3:
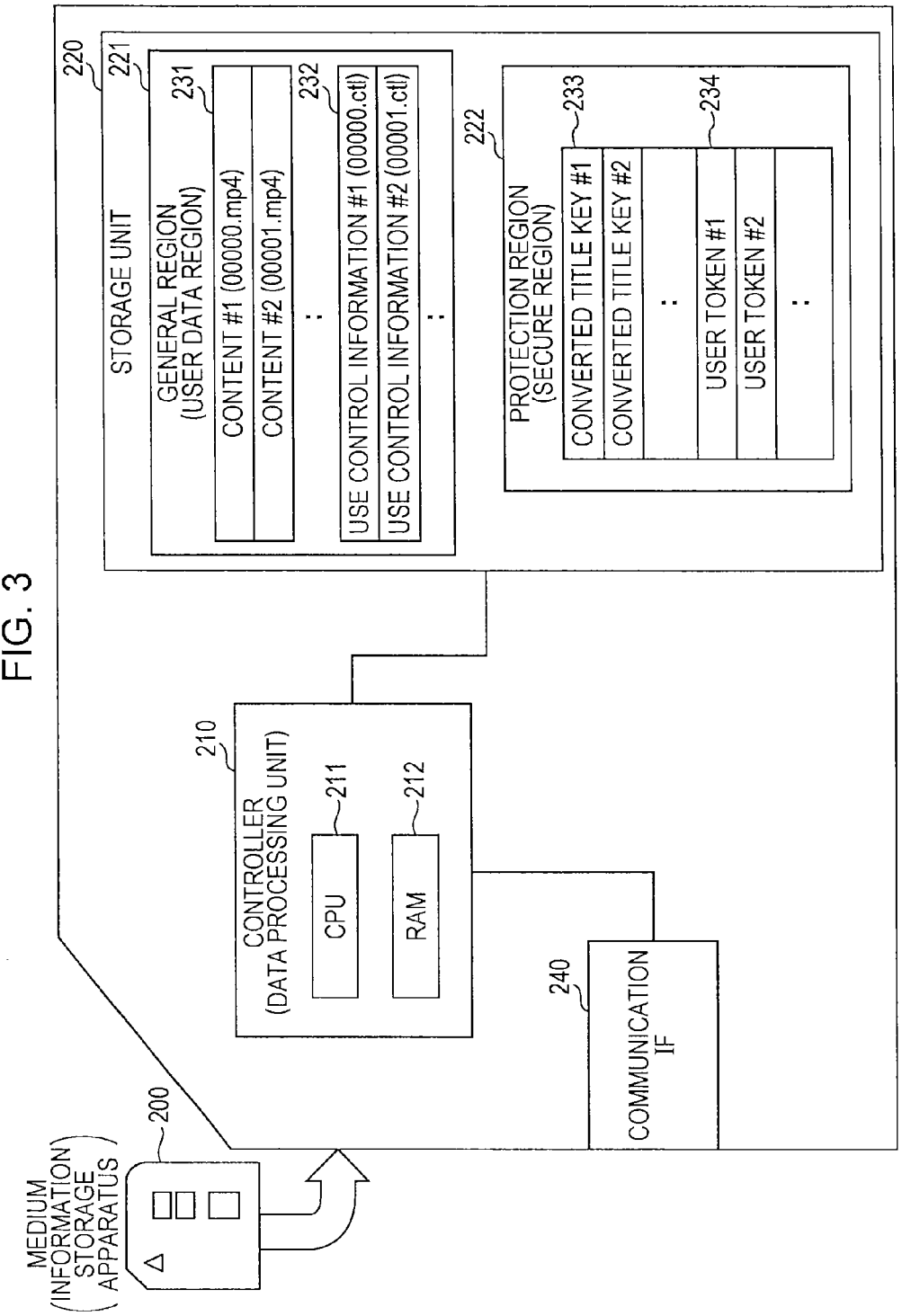
FIG. 3 is a diagram illustrating a specific configuration example of a medium, on which content is stored.

FIG. 3 is a diagram showing an internal configuration example of the medium 200.

The medium 200 is mounted on the host device 100 which is the information processing apparatus for recording and reproducing content, for example, and accessed by the information processing apparatus 100 or a server or the like which is connected via the information processing apparatus 100 to read data therefrom and write data thereon.

The medium 200 includes a controller (data processing unit) 210, a storage unit 220, and a communication IF 240 as shown in FIG. 3.

The medium 200 communicates with the host device (information processing apparatus) 100, for example, via the communication IF 240.

The controller (data processing unit) 210 includes a CPU 211 which has a function of executing programs, a RAM 212, and the like. The RAM 212 is used as a region for recording a data processing program and various parameters to be executed by the CPU, an identifier unique to the medium (medium ID), key information, and the like.

The storage unit 220 is divided into a general region (user data region) 221, free access to which can be basically permitted, and a protection region (secure region) 222, free access to which is not permitted.

In addition, the protection region (secure region) 222 is further divided into a plurality of blocks and has a configuration in which access control can be performed in units of blocks.

In the general region (user data region) 221, content 231 provided by a content server or the like and use control information 232 recording use permission information such as copy control information corresponding to the content are recorded, for example. The content is encrypted by a title key in many cases.

The use control information is set corresponding to content and is provided along with the content in many cases. For example, when content is downloaded from the server and recorded, the use control information corresponding to the downloaded content is also downloaded and recorded.

Various kinds of confidential information are recorded in the protection region (secure region) 222.

For example, an encryption key (title key) applied to decoding the content is recorded.

Figure 4:
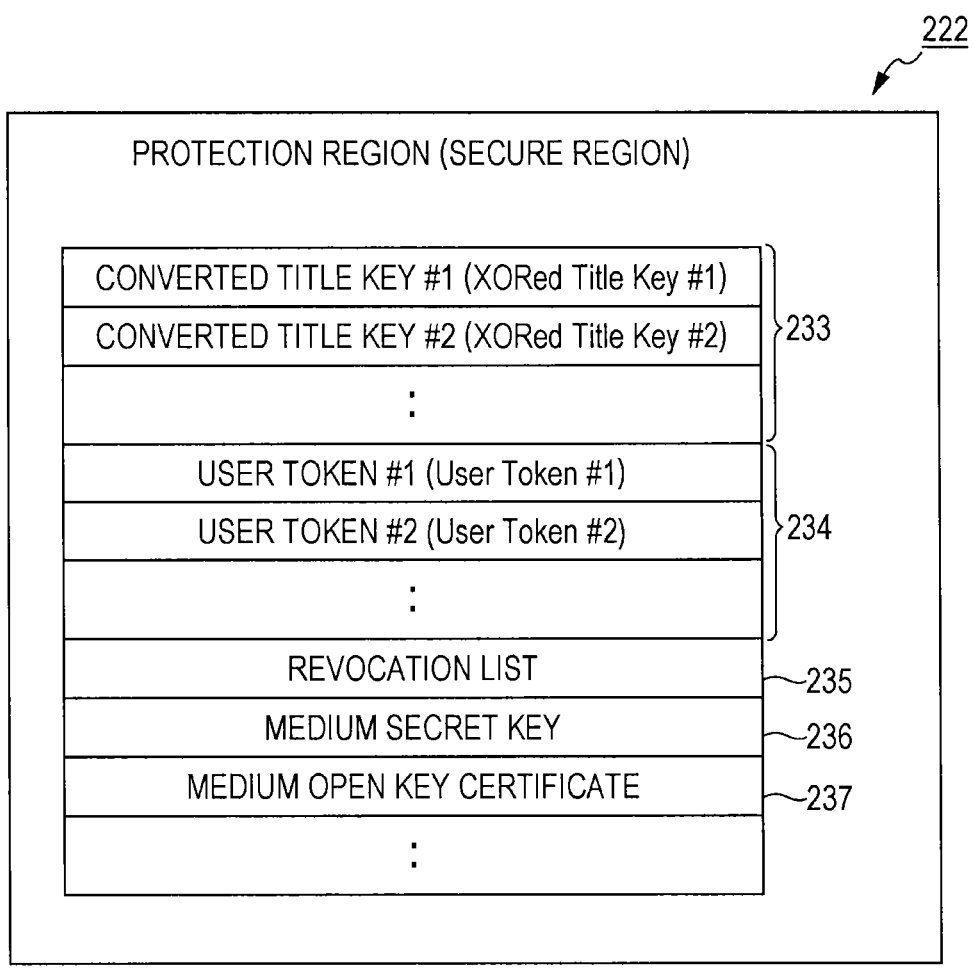
FIG. 4 is a diagram illustrating an example of data stored in a protection area of a medium.

FIG. 4 shows a specific example of data stored on the protection region (secure region) 222. As shown in FIG. 4, the following data is stored on the protection region (secure region) 222, for example.

Converted title key (XORed Title Key) 233
User Token 234
Revocation list 235
Medium secret key 236
Medium open key certificate 237

The converted title key 233 is converted data of a title key which is an encryption key to be applied to encryption and decoding processing of the content recorded in the general region 221.

The title key stored on the protection region (secure region) 222 is stored as a converted title key after predetermined data conversion.

Specifically, the title key is stored as data of a result of an exclusive logical add (XOR) operation between a hash value of the use control information (Usage Rule) 232 corresponding to the content stored on the general region (user data region) 221 and the title key.

Specifically, the converted title key (XORed Title Key) is calculated by the following Equation 1.

$$\text{XORed Title Key} = (\text{Title Key})(XOR)(H\text{-Usage Rule}) \quad \text{(Equation 1)}$$

In addition, A(XOR)B means an exclusive logical add (XOR) operation between data A and data B.

The above Equation 1 is an equation for calculating the converted title key (XORed Title Key) by the exclusive logical add operation between the title key (Title Key) and the hash value of the use control information 232 (H-Usage Rule).

Equation 1 is an example of the setting of the converted title key. The title key is not limited to Equation 1, and other setting such as a configuration of calculating the title key by an operation using data other than the use control information is also applicable.

In decoding the content, the converted title key 233 stored on the protection region (secure region) 222 is acquired, the title key is calculated by executing a predetermined operation, and decoding processing of the encrypted content is executed by using the calculated title key.

3. Concerting Detailed Sequence of Communication Processing Between Host Device and Medium in Reproducing Content Next, a description will be given of a communication sequence executed between the host device and the medium before or after the start of the content reproduction with reference to the communication sequence diagrams in FIGS. 5 and 6.

Figure 5:
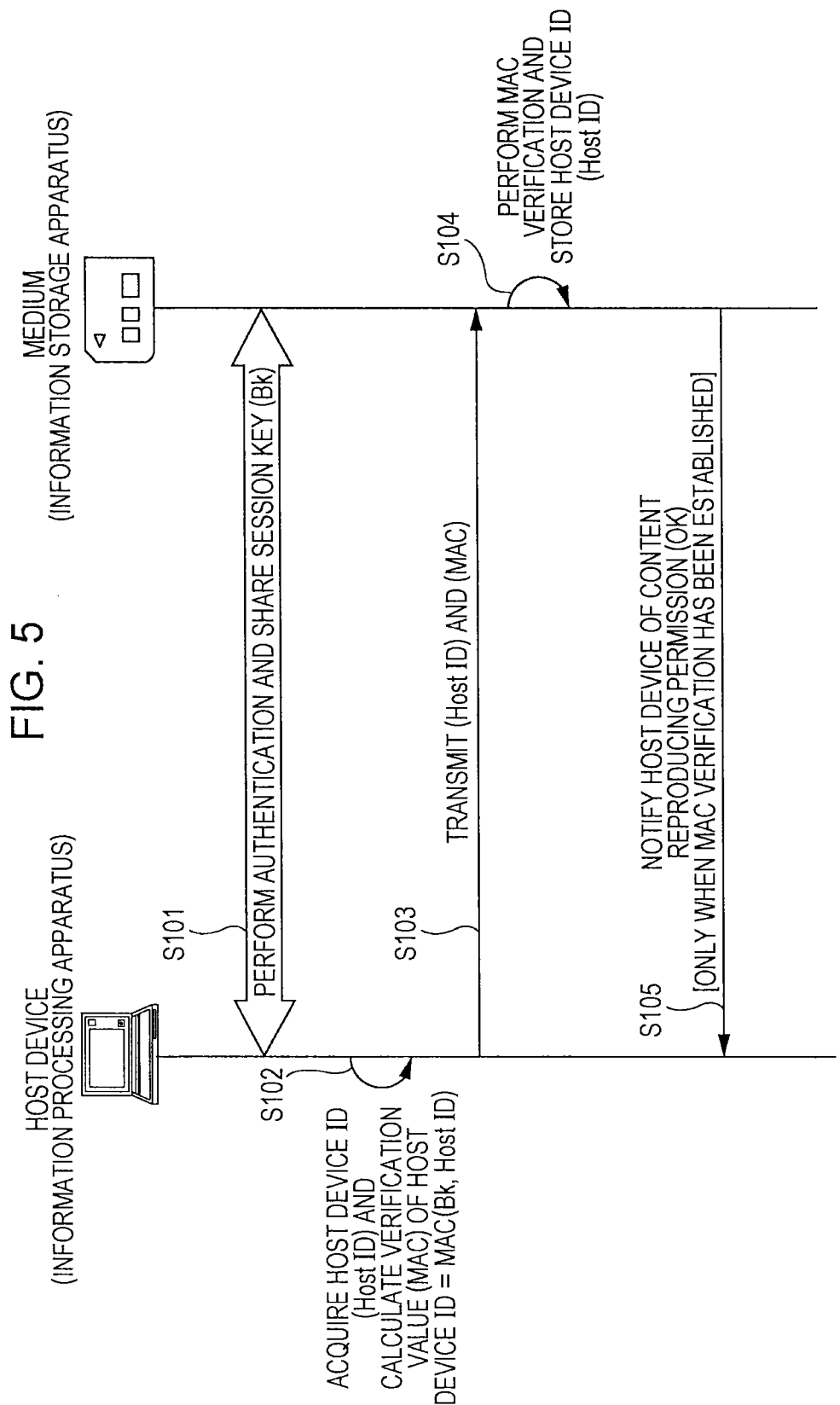
FIG. 5 is a diagram illustrating a sequence of host device registration processing which is executed between a host device (information processing apparatus) for reproducing content and a medium (information storage apparatus)
Figure 6:
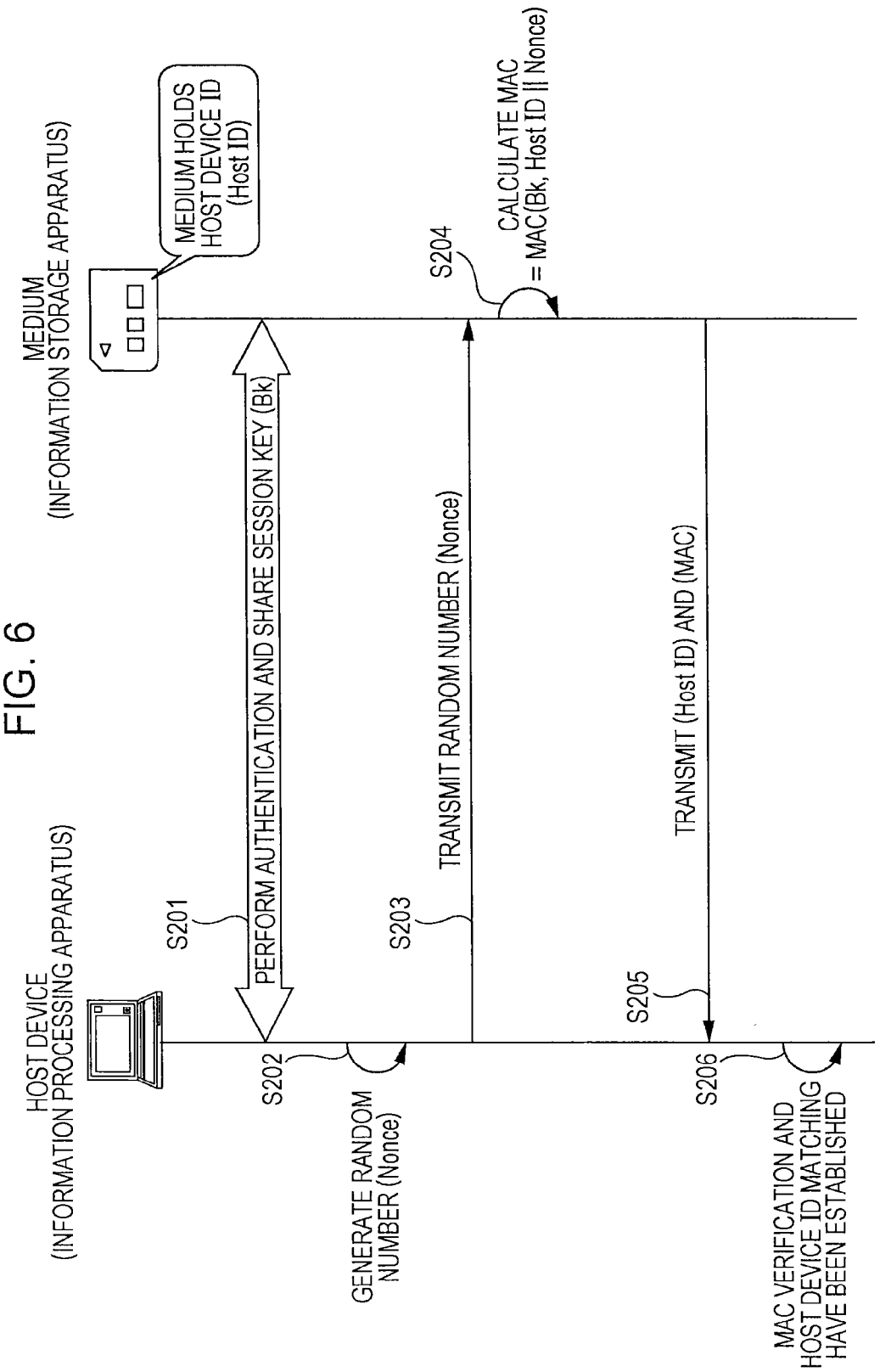
FIG. 6 is a diagram illustrating a sequence of host device-medium connection consistency confirmation processing which is executed between the host device (information processing apparatus) for reproducing content and the medium (information storage apparatus)

FIGS. 5 and 6 are diagrams showing communication sequences executed by the host device 100 which reproduces the content stored on the medium 200 by mounting the medium 200 on the medium interface and the medium 200 which stores the content to be reproduced thereon.

In reproducing the content, the host device 100 and the medium 200 execute the following two kinds of processing.
(1) Sequence shown in FIG. 5: processing for registering host device in medium
(2) Sequence shown in FIG. 6: processing for confirming connection consistency between host device and medium The processing for registering the host device in the medium as shown in FIG. 5 is processing for transmitting a host device ID, which is an identifier of the host device 100 for reproducing the content, to the medium 200 and stores the host device ID on the medium 200. The registration processing is performed as a condition, and content reproducing permission is then transmitted from the medium to the host device 100.

Only the host device with the host device ID which has been registered in the medium is set as the content reproduction permitted device.

The processing for confirming connection consistency between the host device and the medium as shown in FIG. 6 is processing executed periodically when the content is reproduced by the host device 100, and is executed as processing for confirming that no change has been made in the connection relationship between the host device 100 which executes the content reproduction and the medium which provides the content.

In addition, the sequence shown in FIG. 5 is processing executed once before the start of the content reproduction. On the other hand, the sequence shown in FIG. 6 is processing repeatedly executed during the period of the content reproduction.

3-1. Concerning Processing for Registering Host Device in Medium

First, a description will be given of the sequence of the processing for registering the host device in the medium with reference to FIG. 5.

The processing is processing for transmitting the host device ID, which is an identifier of the host device 100 for reproducing the content, to the medium 200 and storing the host device ID on the storage unit of the medium 200. The registration processing is processing for registering the host device permitted to reproduce the content which is stored on the medium. The processing for storing the host device ID (Host ID), which is an identifier of the host device, on the storage unit of the medium is completed as a condition, and the content reproducing permission is then transmitted from the medium to the host device 100.

Hereinafter, a description will be given in turn of the processing in the respective steps in the sequence diagram shown in FIG. 5.

Step S101

First, the host device and the medium execute cross authentication processing for confirming reliability of counterpart devices and session key (=bus key; Bk) sharing processing in Step S101. The processing is executed as cross authentication processing and key sharing processing based on an open key encryption scheme in order that reliability of both the host device and the medium is confirmed and processing for generating and sharing a session key (=bus key; Bk) is performed.

Specifically, each apparatus verifies a signature of an open key certificate of the counterpart and further confirms that an identifier (ID) of each apparatus recorded in the open key certificate is not recorded in a revocation list which is certificate and device invalidation information.

If the signature verification is failed, or the ID is registered in the revocation list, it is determined that reliability between the apparatuses has not been confirmed, and the following processing is not executed. In such a case, content reproduction processing and the like is not executed by the host device.

Step S102

If the cross authentication processing and the session key (Bk) sharing processing are successfully performed in Step S101, in Step S102, the host device acquires the host device ID (Host ID), which is an identifier of the host device, from a memory thereof and calculates a verification value of the acquired host device ID, for example a Message Authentication Code (MAC).

In addition, the host device ID (Host ID) is an identifier unique to the host device. Various data can be used as long as the host device ID is identification information unique to the host device.

Specifically, a serial number corresponding to the host device, a SIM card ID set for a SIM card unique to the host device, a Media Access Control Address (MAC Address), a product ID, or the like is used, for example. In addition, such data is stored on a nonvolatile memory or the like of the host device as data which is not easily falsified and rewritten.

In Step S102, the host device acquires the host device ID (Host ID) from the memory thereof and calculates the verification value (MAC), to which the session key (Bk) based on the acquired host key ID is applied.

When (Host ID) represents the host device ID, the verification value (MAC) is calculated by the following Equation 2, for example.

$$\text{MAC}(Bk, \text{Host ID}) \tag{Equation 2}$$

In Equation 2, MAC(a, b) means Message Authentication Code (MAC) calculation processing, to which a key a is applied to data b.

Step S103

Next, the host device transmits the host device ID (Host ID) which has been acquired from the memory thereof and the verification value (MAC) which has been calculated by Equation 2 to the medium.

Step S104

Next, the medium receives the host device ID (Host ID) and the verification value (MAC) calculated by Equation 2 from the host device and performs MAC verification based on the received data. Specifically, the medium calculates a MAC value for the host device ID (Host ID), which has been received from the host device, to which the session key (Bk) shared in the authentication processing in Step S101 has been applied, and confirms whether or not the calculated MAC value coincides with the received MAC value which has been received from the host device.

If the calculated MAC value coincides with the received MAC value, the medium determines that the MAC verification has been successfully made, stores the host device ID (Host ID), which has been received from the host device, on the storage unit of the medium, and moves onto the next processing.

If the calculated MAC value does not coincide with the received MAC value, there is a possibility that the received data is falsified data, and the medium stops the processing without executing the following processing.

In addition, setting of transmitting an error message from the medium to the host device in such a case is also applicable.

Step S105

If the MAC verification by the medium has been successfully made and the processing for storing the host device ID on the medium has been completed in Step S104, the medium notifies the host device of the content reproducing permission in Step S105.

In addition, the authentication session in a state where the session key (Bk) is shared by the host device and the medium is completed after the processing in Step S105. When the authentication session is completed, the session key (Bk) shared by the host device and the medium is abandoned.

The host device 100 can access the general region 221 in the medium 200 as shown in FIG. 3 even after the authentication session is completed, and can sequentially acquire, decode, and reproduce the encrypted content 231 from the general region 221.

In reproducing the content, the processing shown in FIG. 6 as will be described below, namely the processing for confirming connection consistency between the host device and the medium is repeatedly executed.

3-2. Processing for Confirming Connection Consistency Between Host Device and Medium Next, a description will be given of a sequence of the processing for confirming connection consistency between the host device and the medium with reference to the sequence diagram shown in FIG. 6.

The processing is processing periodically executed during the content reproduction by the host device 100, and is processing for confirming that no change has been made in the connection relationship between the host device 100 which reproduces the content and the medium which provides the content.

The sequence shown in FIG. 6 is repeatedly executed during the content reproduction by the host device.

Hereinafter, a description will be given of the processing in the respective steps.

Step S201

In Step S201, the host device and the medium execute cross authentication processing for confirming reliability of the counterpart devices and session key (=bus key: Bk) sharing processing.

The host device and the medium executes the authentication processing to mutually confirm reliability and performs processing for sharing the session key (Bk) in Step S101 shown in FIG. 5 even in the processing before the content reproduction described above with reference to FIG. 5. However, the authentication session set in Step S101 has been completed once before the start of the content reproduction, and the session key (Bk) shared by the host device and the medium has also been abandoned as described above.

Therefore, cross authentication is executed again when the processing for confirming connection consistency between the host device and the medium as shown in FIG. 6 is executed after the completion of the sequence in FIG. 5.

That is, the host device and the medium newly execute the cross authentication processing for confirming reliability of the counterpart devices and the session key (=bus key: Bk) sharing processing between the host device and the medium and starts a new authentication session in Step S201 shown in FIG. 6.

In the same manner as in the authentication processing in Step S101 described above with reference to FIG. 5, the authentication processing in Step S201 is also cross authentication processing and key sharing processing based on the open key encryption scheme, for example, in order that the reliability of both the host device and the medium is confirmed and the processing for generating and sharing of the session key (=bus key: Bk) is performed.

Specifically, each apparatus verifies a signature of the open key certificate of the counterpart and further confirms that the device ID or the like recorded in the open key certificate is not recorded in the revocation list.

If the signature verification is failed, or the device ID is registered in the revocation list, the following processing is not executed. In such a case, the content reproduction processing is stopped.

Step S202

If the cross authentication processing and the session key (Bk) sharing processing are successfully performed in Step S201, the host device executes random number (Nonce) generation processing in Step S202.

Step S203

Next, the host device transmits the random number (Nonce) generated in Step S202 to the medium.

Step S204

Then, the medium calculates the verification value (MAC), to which the random number (Nonce) received from the host device and the host device ID (Host ID) received from the host device and stored on the storage unit in the processing before the start of the content reproduction, namely the host device registration processing described above with reference to FIG. 5 is applied.

That is, the medium applies the host device ID (Host ID) which has been received by the medium from the host device and stored on the storage unit of the medium in Step S104 in FIG. 5.

When (Nonce) represents the received random number, and (Host ID) represents the host device ID stored on the storage unit, the medium calculates the verification value (MAC) based on the following Equation 3.

$$\text{MAC}(Bk, \text{Host ID} \| \text{Nonce}) \tag{3}$$

In Equation 3, MAC(a, b∥c) means processing for calculating Message Authentication Code (MAC), to which the key a for a coupled data of data b and data c is applied.

Equation 3 is an equation for calculating the verification value (MAC), to which the session key (Bk) for the coupled data of the host device ID (Host ID) and the random number (Nonce) is applied.

Step S205

Next, the medium transmits the verification value (MAC), to which the session key (Bk) for the coupled data of the host device ID (Host ID) calculated in Step S204 and the random number (Nonce) is applied, to the host device along with the host device ID which has been acquired from the storage unit.

Step S206

Next, the host device executes verification processing by using the data received from the medium, namely the received data of (a) the verification value (MAC), to which the session key (Bk) for the coupled data of the host device ID (Host ID) and the random number (Nonce) is applied, and (b) the host device ID (Host ID).

The host device executes the following two kinds of processing as the verification processing.

(1) MAC verification processing by applying received verification value (MAC)

(2) Matching processing between received host device ID (Host ID) and host device ID (Host ID) stored on memory device of itself, namely memory of host device First, (1) MAC verification processing by applying received verification value (MAC) is executed in the following procedure.

By applying the received host device ID (Host ID) and the random number (Nonce) generated in Step S202, a MAC value is newly calculated. That is, the MAC value is calculated by the following Equation 4 in the same manner as in Equation 3 described above.

$$\text{MAC}(Bk, \text{Host ID} \| \text{Nonce}) \quad \text{(Equation 4)}$$

The host device matches the calculated MAC calculated by Equation 4 with the MAC value received from the medium, determines that the MAC verification has been established if the values matches each other, and confirms that the host device ID (Host ID) received from the medium is a correct host device ID (Host ID) corresponding to the content reproduction permitted host device which has been registered in the medium.

If the MAC verification is not established, the following processing is stopped. In such a case, content reproduction is also stopped.

If the MAC verification has been established, the host device then performs (2) matching processing between host device IDs, namely the following matching processing:

(2) matching processing between received host device ID (Host ID) and host device ID (Host ID) stored on a memory device of itself, namely a memory of host device.

The processing is processing for matching the host device ID (Host ID) which has been received by the host device from the medium with the host device ID (Host ID) which has been stored on the memory of itself, namely the memory of the host device.

The host device determines that the matching has been established if it is confirmed that the host device ID (Host ID) received from the medium coincides with the host device ID (Host ID) stored on the memory of itself, namely the memory of the host device, and continues the content reproduction.

On the other hand, the host device determines that the matching has not been established if the received host device ID (Host ID) does not coincide with the host device ID (Host ID) stored on the memory of the host device, and stops the content reproduction.

As described above, it is necessary that the following two kinds of processing, namely the verification processing and the matching processing are established in order to continue the content reproduction.

(1) MAC verification processing by applying received verification value (MAC)
(2) Matching processing between received host device ID (Host ID) and host device ID (Host ID) stored on a memory device of itself, namely memory of host device If any one of (1) MAC verification and (2) matching processing between host device IDs is not established, the content reproduction is stopped.

As described above, the connected device confirmation processing as shown in FIG. 6 is periodically repeated during the content reproduction. The processing is repeatedly executed at a preset interval, for example, once in three minutes, five minutes, or ten minutes.

In addition, the authentication session between the host device and the medium set in the authentication processing in Step S201 shown in FIG. 6 is completed when the processing in Step S206 is completed, and the session key (Bk) shared by the host device and the medium is abandoned every time.

Therefore, the processing as shown in FIG. 6, which is repeatedly executed during the content reproduction, is executed by setting a new authentication session by new authentication processing every time.

That is, a new session key (Bk) is shared to set a new authentication session every time in the authentication processing in Step S201, and the processing in Steps S201 to S206 is then executed.

3-3. Processing for Deregistering Host Device which has been Registered as Reproduction Permitted Device in Medium Next, a description will be given of a sequence of processing for deregistering the host device, which has been registered as the reproduction permitted device in the medium, with reference to the sequence diagram shown in FIG. 7.

When the content stored on the medium is read and reproduced, it is necessary to execute the processing for registering the host device ID as described above with reference to FIG. 5. Thereafter, the processing for confirming connection consistency between the host device and the medium based on the sequence as shown in FIG. 6 is executed during the content reproduction.

Thereafter, when the host device completes the reproduction of the content stored on the medium, the host device issues a deregistration request to the medium and executes processing for deleting the host device ID recorded in the medium.

By such processing for deregistering the host device, the host device ID stored on the medium is deleted, and another host device which uses the medium can smoothly execute new registration processing.

If the medium does not receive the random number from the host device even after a preset longest permissible time in the processing for confirming connection consistency between the host device and the medium based on the sequence shown in FIG. 6, the medium can delete the host device ID stored on the medium and forcibly execute the deregistration. By such deregistration, another host device can perform new registration processing.

However, it is necessary to wait until the predetermined time elapses, and it is preferable to execute deregistration processing as will be described below in order to make it possible to immediately perform the registration processing by a new host device.

Hereinafter, a description will be given of a sequence of processing for deregistering the host device, which has been registered as the reproduction permitted device in the medium, with reference to the sequence diagram shown in FIG. 7.

Hereinafter, processing in the respective steps will be described.

Step S251

In Step S251, the host device and the medium executes cross authentication processing for confirming reliability of counterpart devices and session key (=bus key: Bk) sharing processing.

The authentication processing is also the cross authentication processing and the key sharing processing based on the open key encryption scheme, for example, in the same manner as the authentication processing in Step S101 described above with reference to FIG. 5, reliability of both the host device and the medium is confirmed, and processing for generating and sharing the session key (=bus key: Bk) is performed.

Specifically, each apparatus verifies a signature of the open key certificate of the counterpart and confirms that the device ID and the like recorded in the open key certificate is not recorded in the revocation list.

If the signature verification is failed, or the device ID is registered in the revocation list, the following processing is not executed.

Step S252

If the cross authentication processing and the session key (Bk) sharing processing in Step S251 are successfully performed, the host device acquires the host device ID (Host ID), which is an identifier of the host device, from the memory of the host device itself and calculates a verification value of the acquired host device ID, for example, a Message Authentication Code (MAC) in Step S252.

In addition, the verification value (MAC) of the host device ID (Host ID) is calculated by the aforementioned Equation 2 in the same manner as in the aforementioned processing in Step S102 in the sequence of FIG. 5.

Step S253

Then, the host device transmits a deregistration request to the medium. That is, the host device transmits a deregistration request for causing the medium to delete the host device ID (Host ID) of the host device which has been recorded as the content reproduction permitted device.

In transmitting the deregistration request, the host device transmits the host device ID (Host ID) which has been acquired from the memory of the host device itself in Step S252 and the generated verification value (MAC) to the medium.

Steps S254 and 255

Next, the medium receives the deregistration request transmitted from the host device with the host device ID (Host ID) and the verification value (MAC), and first, performs MAC verification based on the received data. Specifically, the medium calculates the MAC value for the host device ID (Host ID), which has been received from the host device, by applying the session key (Bk) shared in the authentication processing in Step S251 and confirms whether or not the calculated MAC value coincides with the received MAC value which has been received from the host device.

If the calculated MAC value does not coincide with the received MAC value, there is a possibility that the received data is falsified data, and the processing is stopped without executing the following processing.

In addition, setting of transmitting an error message from the medium to the host device in such a case is also applicable.

If the calculated MAC value coincides with the received MAC value, the medium determines that the MAC verification has been successfully performed and then determines whether or not the host device ID (Host ID) received from the host device coincides with the host device ID stored on the storage unit of the medium.

If the received host device ID coincides with the stored host device ID, the medium determines that the deregistration request is a valid deregistration request from the host device which has been registered as the content reproduction permitted device and executes the deregistration processing for deleting the host device ID stored on the storage unit of the medium in response to the request.

Furthermore, the medium notifies the host device of completion of the deregistration processing in the following Step S255.

On the other hand, if the host device ID (Host ID) received from the host device does not coincide with the host device ID stored on the storage unit of the medium, the medium determines that the deregistration request is not a valid deregistration request from the host device which has been registered as the content reproduction permitted device. In such a case, the medium does not respond to the deregistration request and does not execute the processing for deleting the host device ID stored on the storage unit of the medium.

It is possible to delete the host device ID of the host device which has been registered as the content reproduction permitted device in the medium by the deregistration processing based on the sequence shown in FIG. 7 and to thereby smoothly record a host device ID of a new host device in the medium when the new host device executes the registration processing shown in FIG. 5 later.

4. Concerning Details of Processing Executed by Host Device

Next, a description will be given of a detailed sequence of processing executed by the host device which reads and reproduces content from the medium with reference to the flowcharts shown in FIGS. 8 to 10.

Figure 8:
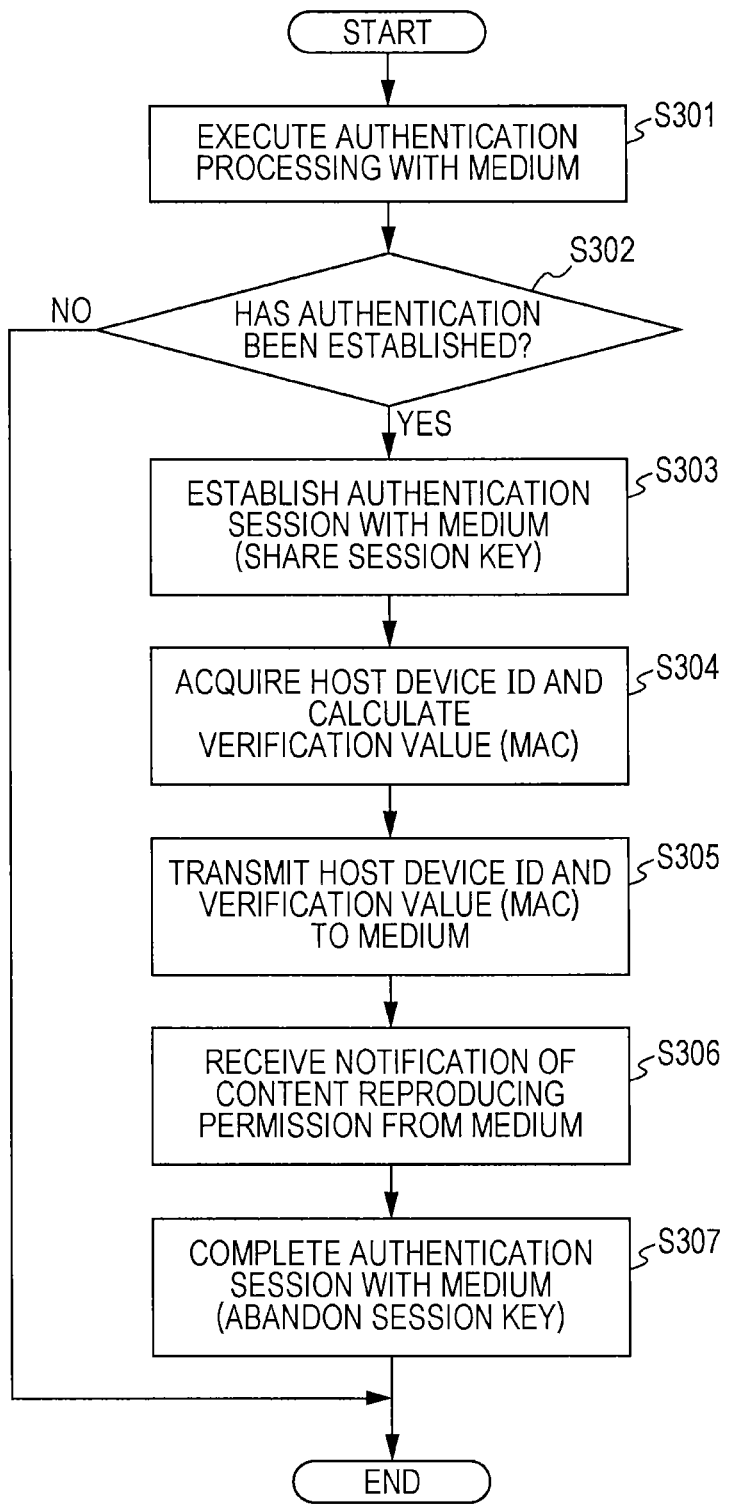
FIG. 8 is a diagram showing a flowchart for illustrating processing which is executed by the host device in the sequence of the host device registration processing.
Figure 9:
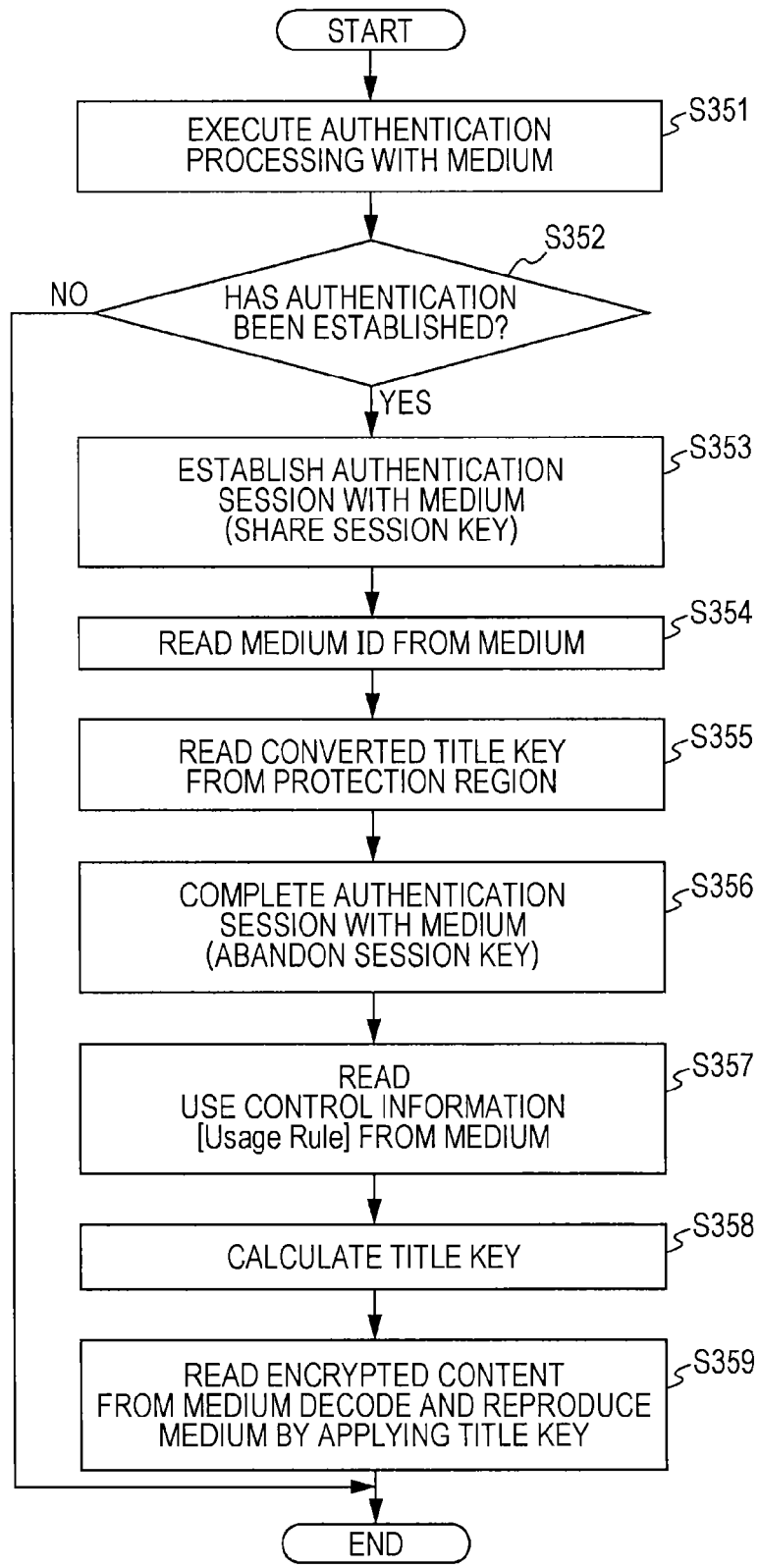
FIG. 9 is a diagram showing a flowchart for illustrating a sequence of content reproduction preparation processing which is executed by the host device for reproducing content.
Figure 10:
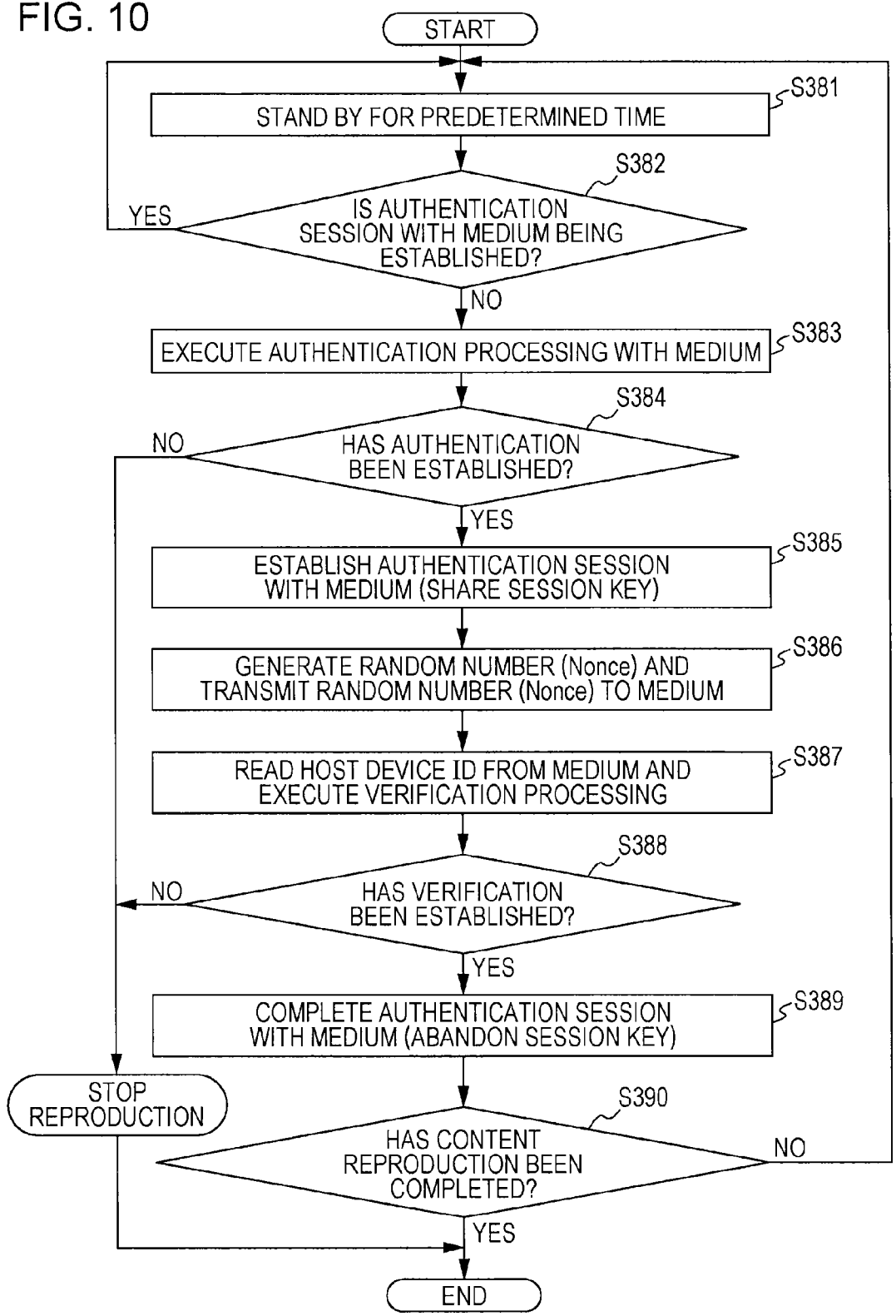
FIG. 10 is a diagram showing a flowchart for illustrating processing executed by the host device in the sequence of the host device-medium connection consistency confirmation processing.

The flows in FIGS. 8 to 10 are flowcharts for respectively illustrating the following processing sequences.

(1) FIG. 8: Processing for registering host device in medium
(2) FIG. 9: Processing for preparing for content reproduction by host device
(3) FIG. 10: Processing for confirming connection consistency between host device and medium In addition, [(1) FIG. 8: Processing for registering host device in medium] corresponds to the processing on the side of the host device in the sequence described above with reference to FIG. 5.

Moreover, [(3) FIG. 10: Processing for confirming connection consistency between host device and medium] corresponds to the processing on the side of the host device in the sequence described above with reference to FIG. 6.

[(2) FIG. 9: Processing for preparing for content reproduction by host device] is (1) processing executed after completion of the sequence in FIG. 8 and executed as preparation processing in order to start the content reproduction.

In addition, (3) the processing in FIG. 10 is (1) processing periodically and repeatedly executed after the completion of the processing in FIG. 8 and (2) executed in parallel even during a period of executing the processing shown in FIG. 9.

4-1. Processing of Registering Host Device in Medium

First, a description will be given of (1) FIG. 8: Processing for registering host device in medium.

The processing shown in FIG. 8 is processing executed by the host device, on the medium interface of which the medium storing the content to be reproduced is mounted. The processing is executed under control of a data processing unit such as a CPU with a program executing function based on a reproduction processing program stored on the memory of the host device, for example.

Hereinafter, the respective processing steps will be sequentially described.

Step S301

First, the host device, on the medium interface of which the medium storing the content to be reproduced is mounted, executes authentication processing with the medium in Step S301.

The processing corresponds to the processing in Step S101 in the sequence diagram shown in FIG. 5.

That is, the host device and the medium execute cross authentication processing for confirming reliability of the counterpart devices and session key (=bus key: Bk) sharing processing.

Step S302

In Step S302, it is determined whether or not the authentication in Step S301 has been established and the session key (Bk) has been successfully shared. If the cross authentication processing and the session key (Bk) sharing processing are successfully performed, the processing proceeds to Step S303.

If the cross authentication processing and the session key (Bk) sharing processing fail, the processing is completed without executing the processing in Step S303 and the following steps.

In such a case, the content reproduction processing is not executed.

Step S303

If the cross authentication processing and the session key (Bk) sharing processing in Step S301 are successfully performed, an authentication session, namely a data processing sequence, to which the session key (Bk) generated in the authentication processing in Step S301 is applied, is started in Step S303.

Step S304

Next, the host device acquires the host device ID (Host ID), which is an identifier of the host device, from the memory of the host device itself and calculates the verification value of the acquired host device ID, for example, the Message Authentication Code (MAC) based on the following Equation 2, which was described above, in Step S304.

$$\text{MAC}(Bk, \text{Host ID}) \quad \text{(Equation 2)}$$

In addition, the host device ID (Host ID) is an identifier unique to the host device, and for example, a serial number corresponding to the host device, a SIM card ID set for a SIM card unique to the host device, a Media Access Control (MAC) address, a product ID, or the like is used.

Step S305

In Step S305, the host device transmits the host device ID (Host ID) acquired from the memory of the host device itself and the verification value (MAC) calculated based on Equation 2 to the medium.

Step S306

Then, the host device received, from the medium, notification of content reproducing permission which is issued if the MAC verification has been established in the medium and the processing for registering the host device ID has been completed as conditions.

Step S307

In Step S307, the authentication session in a state where the session key is shared by the host device and the medium is completed. When the authentication session is completed, the session key (Bk) shared by the host device and the medium is also abandoned.

4-2. Processing of Preparing for Content Reproduction by Host Device

Next, a description will be given of a sequence of the processing for preparing for the content reproduction by the host device with reference to the flowchart shown in FIG. 9.

The processing is processing executed after the completion of the sequence of the processing for registering the host device in the medium described above with reference to FIG. 8 and executed as preparation processing for starting the content reproduction.

The processing is also executed under the control of the data processing unit such as the CPU with the program executing function based on the reproduction processing program stored on the memory of the host device, for example, in the same manner as in the processing in FIG. 8.

Hereinafter, the respective steps will be sequentially described.

Step S351

First, the host device which has completed the processing for registering the host device ID in the medium storing the content to be reproduced executes authentication processing with the medium in Step S351.

That is, the host device and the medium execute cross authentication processing for confirming reliability of the counterpart devices and session key (=bus key: Bk) sharing processing.

Step S352

In Step S352, it is determined whether or not the authentication in Step S351 has been established and the session key (Bk) has been successfully shared. If the cross authentication processing and the session key (Bk) sharing processing are successfully performed, the processing proceeds to Step S353.

If the cross authentication processing and the session key (Bk) sharing processing fail, the processing is completed without executing the processing in Step S353 and the following steps.

In such a case, the content reproduction processing is not executed.

Step S353

If the cross authentication processing and the session key (Bk) sharing processing are successfully performed in Step S351, an authentication session, namely a sequence of data processing, to which the session key (Bk) generated in the authentication processing in Step S351 is applied, is started in Step S353.

Step S354

Next, the host device reads a medium ID, which is a medium identifier, from the medium in Step S354.

Step S355

Furthermore, the host device acquires a converted title key, which is obtained by converting a title key to be applied to the decoding of the encrypted content to be reproduced, from the protection region (see FIG. 3) set in the medium storage unit.

Step S356

Next, the authentication session in a state where the host device and the medium share the session key is completed in Step S356. When the authentication session is completed, the session key (Bk) shared by the host device and the medium is also abandoned.

In addition, the general region of the medium can be accessed even after the completion of the authentication session, and the host device performs the content reproduction processing by acquiring data from the general region of the medium as will be described below.

Step S357

In Step S357, the host device acquires use control information corresponding to the content to be reproduced from the general region of the medium.

Step S358

Next, the host device uses the converted title key acquired in Step S355 and the use control information acquired in Step S357 to calculate the title key to be applied to the decoding of the encrypted content in Step S358. The calculation of the title key is executed by the following Equation 5.

$$\text{Title key} = (\text{XORed Title Key})(\text{XOR})(H\text{-Usage Rule}) \quad \text{(Equation 5)}$$

In addition, A(OXR)B means an exclusive logical add operation between data A and B.

The above equation is an equation for calculating the title key (Title Key) by the exclusive logical add operation between the converted title key (XORed Title Key) and a hash value of the use control information (H-Usage Rule).

Step S359

Next, the host device acquires the encrypted content to be reproduced from the general region of the medium, decodes the encrypted content by applying the title key calculated in Step S358, and starts the content reproduction in Step S359.

4-3. Processing for Confirming Connection Consistency Between Host Device and Medium Next, a description will be given of a processing sequence on the side of the host device, which is executed in the processing for confirming connection consistency between the host device and the medium, with reference to FIG. 10.

The processing corresponds to the processing on the side of the host device in the sequence diagram which was described above with reference to FIG. 6.

The processing is processing executed after the completion of the sequence of the processing for registering the host device in the medium as described above with reference to FIG. 8, and periodically and repeatedly executed even during the content reproduction. The processing is executed in parallel even in the period of the processing for preparing for the content reproduction by the host device as shown in FIG. 9 in some cases.

The processing shown in FIG. 10 is also executed under the control of the data processing unit such as the CPU with the program executing function based on the reproduction processing program stored on the memory of the host device, for example, in the same manner as in the processing shown in FIGS. 8 and 9.

Hereinafter, the respective steps will be sequentially described.

Step S381

First, the host device, on the medium interface of which the medium storing the content to be reproduced is mounted, stands by during a predetermined time in Step S381. This state is standby after the completion of the processing shown in FIG. 8 or standby after the completion of the processing based on the flow shown in FIG. 10.

The processing shown in FIG. 10 is periodically repeated at a prescribed interval, for example, once in three minutes or five minutes. In relation to the timing at which the processing is executed, it is possible to employ a configuration in which the processing is repeatedly executed at a random time interval or a configuration in which the processing is executed at time designated in advance.

The standby time in Step S381 corresponds to the time interval of the repeated processing.

Step S382

After the standby for the predetermined time in Step S381, it is determined in Step S382 whether or not the authentication session with the medium has been set. Specifically, it is determined whether or not the authentication session in the processing based on the flow shown in FIG. 9 is being executed.

If the authentication session has been set, two authentication sessions are not set at the same time, and therefore, the processing returns to Step S381, and the host device stands by.

If the authentication session has not been set, the processing proceeds to Step S383.

Step S383

Next, the host device executes the authentication processing with the medium in Step S383.

The processing corresponds to the processing in Step S201 in the sequence diagram shown in FIG. 6.

That is, the host device and the medium execute cross authentication processing for confirming reliability of the counterpart devices and session key (=bus key: Bk) sharing processing.

Step S384

In Step S384, it is determined whether or not the authentication in Step S383 has been established and the session key (Bk) has been successfully shared. If the cross authentication processing and the session key sharing processing are successfully performed, the processing proceeds to Step S385.

If the cross authentication processing and the session key sharing processing fail, the content reproduction processing is stopped and completed without executing the processing in Step S385 and the following steps.

Step 385

If the cross authentication processing and the session key (Bk) sharing processing are successfully performed in Step S383, the authentication session, namely the data processing sequence, to which the session key (Bk) generated in the authentication processing in Step S383 is applied, is started in Step S385.

Step S386

Next, the host device executes a random number (Nonce) generation processing and transmits the generated random number (Nonce) to the medium in Step S386.

Steps S387 and S388

Next, the host device receives the host device ID and the verification value (MAC) from the medium and executes verification processing in Step S387.

The verification processing corresponds to the verification processing in Step S206 descried above with reference to FIG. 6. That is, the verification processing is executed as processing which includes the following two kinds of processing.

(1) MAC verification processing by applying verification value (MAC) received from medium
(2) Matching processing between host device ID (Host ID) received from medium and host device ID (Host ID) stored on memory of host device First, (1) MAC verification processing by applying received verification value (MAC) is executed in the following procedure.

By applying the host device ID (Host ID) received from the medium and the random number (Nonce) generated in Step S386, a MAC value is newly calculated. That is, the MAC value is calculated by the following Equation 4 which was described above.

$$MAC(Bk, \text{Host ID} \| \text{Nonce}) \quad \text{(Equation 4)}$$

If the calculated MAC calculated by Equation 4 coincides with the MAC value received from the medium, it is determined that the MAC verification has been established.

If the MAC verification has been established, (2) matching processing between host device IDs is performed.

If the MAC verification has not been established, the following processing is stopped. In such a case, a result of the determination on verification establishment is No in Step S388, and the content reproduction is stopped. In such a case, the authentication session is also completed, and the processing is completed.

If the MAC verification has been established, (2) matching processing between host device IDs is executed. The processing is processing for matching the host device ID (Host ID) received from the medium with the host device ID (Host ID) stored on the memory of the host device itself.

If the host device ID (Host ID) received from the medium coincides with the host device ID (Host ID) stored on the memory of the host device itself, it is determined that the matching has been established, and the content reproduction is continued.

On the other hand, if the host device ID (Host ID) received from the medium does not coincide with the host device ID (Host ID) stored on the memory of the host device itself, it is determined that the matching has not been established, a result of the determination on verification establishment in Step S388 is No, and the content reproduction is stopped. In such a case, the authentication session is also completed, and the processing is completed.

It is necessary that the following two kinds of processing, namely the verification processing and the matching processing be established in order to obtain Yes as a result of the determination on verification establishment in Step S388 and continue the content reproduction.

(1) MAC verification processing by applying received verification value (MAC)
(2) Matching processing between received host device ID (Host ID) and host device ID (Host ID) stored on memory of host device If any one of (1) MAC verification and (2) matching processing between host device IDs is not established, a result of the determination is No in Step S388. Therefore, the content reproduction is stopped, the authentication session is also completed, and the processing is completed.

Step S389

Next, the authentication session in a state where the session key is shared by the host device and the medium is completed in Step S389. When the authentication session is completed, the session key (Bk) shared by the host device and the medium is also abandoned.

In addition, the general region of the medium can be accessed even after the completion of the authentication session, and the host device acquires data from the general region and performs content reproduction processing as follows.

Step S390

In Step S390, the host device determines whether the content reproduction has been completed. If the reproduction has not been completed, the host device returns to Step S381 to repeatedly execute the same processing after the standby for the predetermined time.

If it is determined in Step S390 that the content reproduction has been completed, the processing is completed.

If the deregistration processing for deleting the host device ID, which has been recorded in the medium, is executed after the completion of the content reproduction, the processing based on the sequence described above with reference to FIG. 7 is executed.

5. Concerning Details of Processing Executed by Medium

Next, a description will be given of a detailed sequence of processing executed by the medium which stores content with reference to the flowcharts shown in FIGS. 11 to 13.

Figure 11:
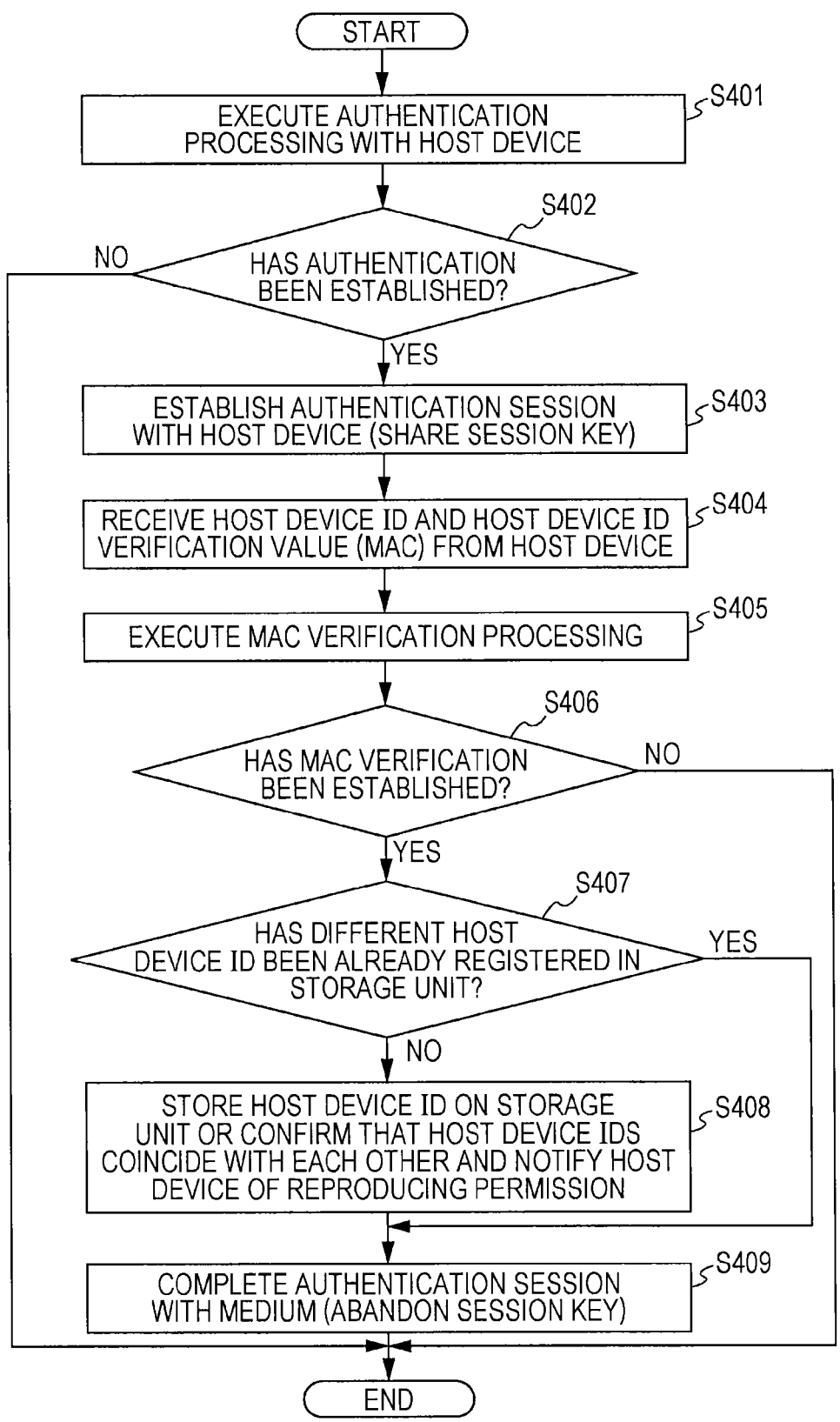
FIG. 11 is a diagram showing a flowchart for illustrating a sequence of processing which is executed by the medium in the sequence of the host device registration processing.
Figure 12:
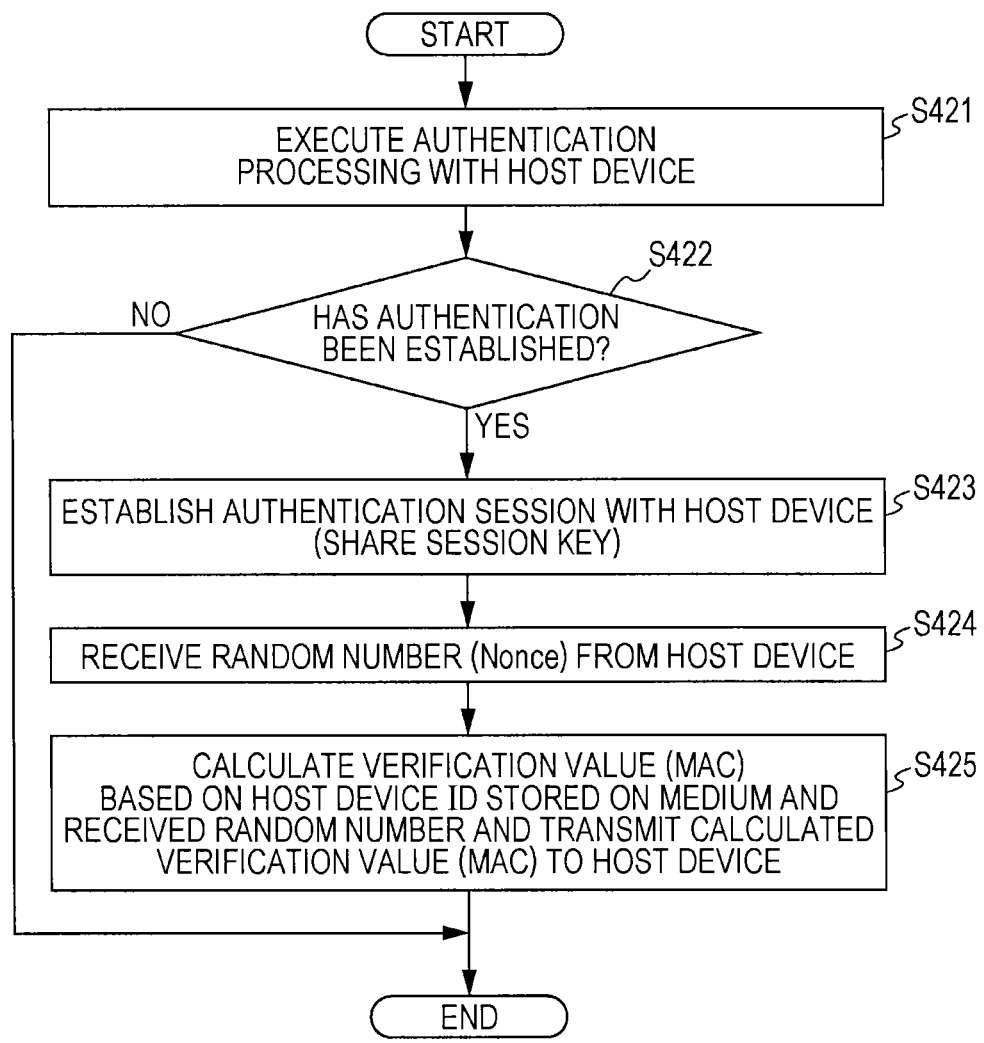
FIG. 12 is a diagram showing a flowchart for illustrating processing which is executed by the medium in the sequence of the host device-medium connection consistency confirmation processing.
Figure 13:
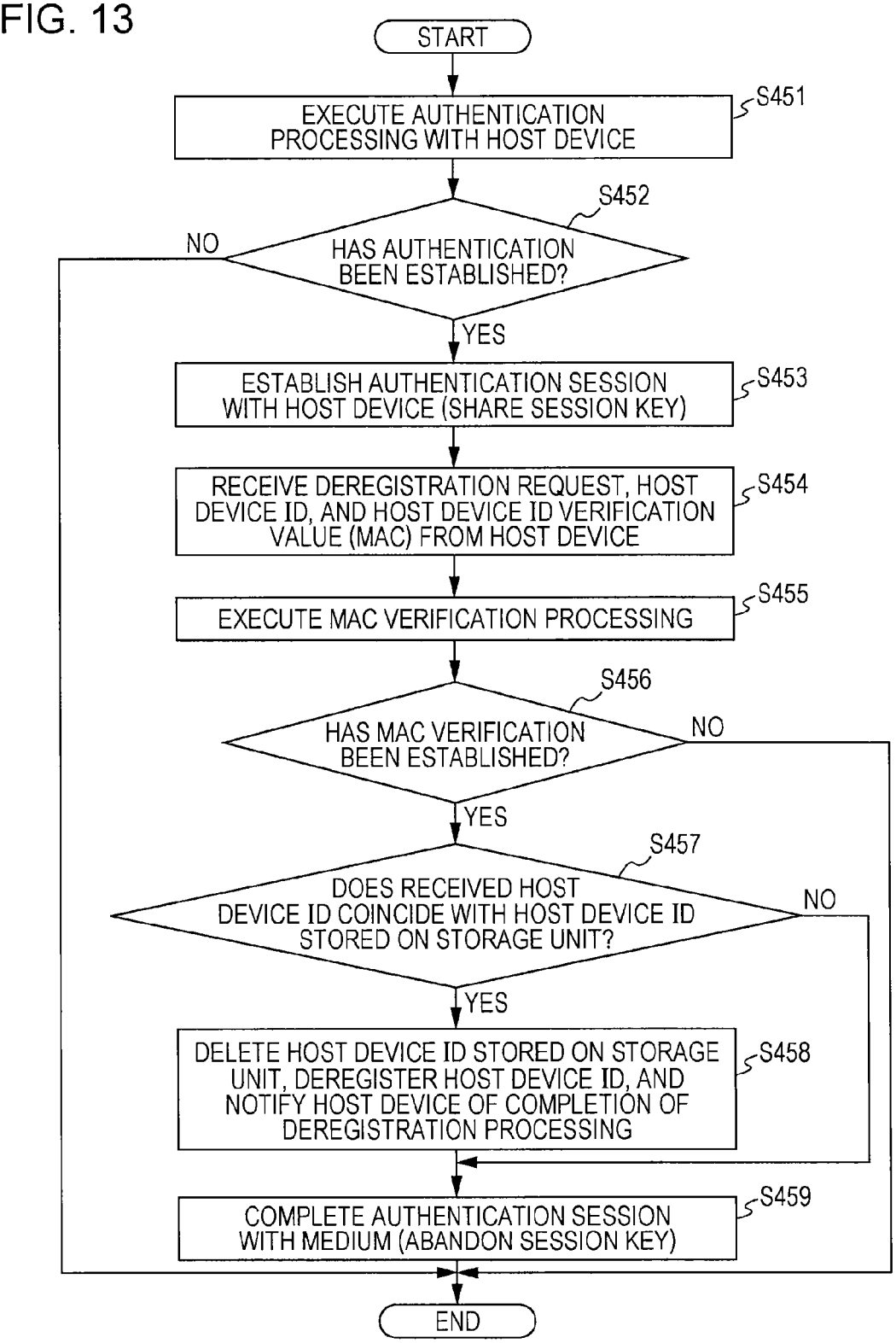
FIG. 13 is a diagram showing a flowchart for illustrating processing which is executed by the medium in the processing for deregistering the host device which has been registered as a reproduction permitted device in the medium.

The flows in FIGS. 11 to 13 are flowcharts respectively illustrating the following processing sequences.
(1) FIG. 11: Processing for registering host device in medium
(2) FIG. 12: Processing for confirming connection consistency between host device and medium
(3) FIG. 13: Deregistration processing for deleting host device ID which has been registered as content reproduction permitted device in medium In addition, [(1) FIG. 11: Processing for registering host device in medium] corresponds to the processing on the side of the medium in the sequence described above with reference to FIG. 5.

Moreover, [(2) FIG. 12: Processing for confirming connection consistency between host device and medium] corresponds to the processing on the side of the medium in the sequence described above with reference to FIG. 6.

5-1. Processing of Registering Host Derive in Medium

First, a description will be given of (1) FIG. 11: Processing for registering host device in medium. The processing shown in FIG. 11 is processing executed by the medium which is mounted on the medium interface of the host device and stores the content to be reproduced. The processing is executed under the control of the data processing unit such as a CPU with the program executing function based on the reproduction processing program stored on the memory of the medium.

Hereinafter, the respective steps will be sequentially described.

Step S401

First, the medium which stores the content to be reproduced executes authentication processing with the host device which is connected via the medium interface in Step S401.

The processing corresponds to the processing in Step S101 in the sequence diagram shown in FIG. 5.

That is, the host device and the medium execute cross authentication processing for confirming reliability of counterparts devices and session key (=bus key: Bk) sharing processing.

Step S402

In Step S402, it is determined whether or not the authentication has been established in Step S401 and the session key (Bk) has been successfully shared. If the cross authentication processing and the session key sharing processing are successfully performed, the processing proceeds to Step S403.

If the authentication processing and the session key sharing processing fail, the processing is completed without executing the processing in Step S403 and the following steps.

In such a case, the content reproduction processing by the host device is not executed.

Step S403

If the cross authentication processing and the session key (Bk) sharing processing are successfully performed in Step S401, an authentication session, namely a data processing sequence, to which the session key (Bk) generated in the authentication processing in Step S401 is applied, is started in Step S403.

Step S404

Then, the medium receives a host device ID and a verification value (MAC) generated based on the host device ID from the host device in Step S404.

The processing corresponds to the processing in Step S103 in the sequence diagram in FIG. 5.

Steps S405 and S406

Next, the medium executes MAC verification based on the MAC, which is a verification value received from the host device, in Step S405.

The processing corresponds to the processing in Step S104 in the sequence diagram in FIG. 5.

A MAC value for the host device ID (Host ID) received from the host device is calculated, and it is determined whether or not the calculated MAC value coincides with the received MAC value received from the host device.

If the calculated MAC value coincides with the received MAC value, it is determined that the MAC verification has been established. A result of the determination in Step S406 is Yes, and the processing proceeds to Step S407.

If the calculated MAC value does not coincide with the received MAC value, it is determined that the MAC verification has not been established. The result of the determination in Step S406 is No, and the processing is completed. In such a case, the content reproduction by the host device is not executed.

Step S407

If it is determined in Steps S405 and S406 that the MAC verification has been established and the reliability of the host ID received from the host device has been confirmed, the medium confirms in Step S407 whether or not a different host device ID has been already registered in the storage unit of the medium. The host device permitted to reproduce the content is limited to a single host device, and reproduction by two or more host devices at the same time is not permitted according to the setting of this embodiment.

Therefore, if a different host ID has been already registered in the storage unit of the medium, a result of the determination in Step S407 is Yes, the processing proceeds to Step S409 without executing the processing for registering the host device ID in Step S408 and the notification about the reproducing permission to the host device. Then, the authentication session is completed, and the processing is completed. In such a case, the content reproduction by the host device is not executed.

On the other hand, if a different host device ID has not been registered in the storage unit of the medium, the result of the determination in Step S407 is No, and the processing for registering the host device ID in Step S408 and the like are executed.

Step S408

If it is determined in Step S406 that the MAC verification has been successfully performed, and it is determined in Step S407 that a different host device ID has not been registered in the storage unit of the medium, the medium stores the host device ID, which has been received from the host device, in the storage unit in Step S408. That is, the medium executes processing for registering identification information of a single host device permitted to reproduce the content.

If the processing for registering the same host device has been already executed, there is a case where the same host device ID as the received host device ID has been stored on the storage unit. In such a case, the medium confirms that the received host device ID coincides with the host device ID which has been already stored on the storage unit.

In Step S408, the medium confirms that the host device ID received from the host device has been stored on the storage unit, or confirms that the host device ID received from the host device coincides with the host device ID which has been already stored on the storage unit, and notifies the host device of the content reproducing permission.

Step S409

Next, the medium completes the authentication session in a state where the session key is shared by the host device and the medium in Step S409. When the authentication session is completed, the session key (Bk) shared by the host device and the medium is also abandoned.

5-2. Processing of Confirming Connection Consistency Between Host Device and Medium Next, a description will be given of a processing sequence on the side of the medium, which is executed in the processing for confirming connection consistency between the host device and the medium, with reference to FIG. 12.

The processing corresponds to the processing on the side of the medium in the sequence diagram described above with reference to FIG. 6.

The processing is processing executed after the completion of the sequence of the processing for registering the host device in the medium as described above with reference to FIG. 11, and periodically and repeatedly executed even during the content reproduction. The processing is executed in parallel even during a period of the processing for preparing the content reproduction by the host device as shown in FIG. 9 described above.

The processing shown in FIG. 12 is processing executed by the medium which is mounted on the medium interface of the host device and stores the content to be reproduced. The processing is executed under the control of the data processing unit such as the CPU with the program executing function based on the reproduction processing program stored on the memory of the medium, for example.

Hereinafter, the respective steps will be sequentially described.

Step S421

First, the medium which stores the content to be reproduced executes authentication processing with the host device connected via the medium interface in Step S421.

The processing corresponds to the processing in Step S201 in the sequence diagram shown in FIG. 6.

That is, the host device and the medium execute cross authentication processing for confirming reliability of counterpart devices and session key (=bus key: Bk) sharing processing.

Step S422

In Step S422, it is determined whether or not the authentication in Step S421 has been established and the session key (Bk) has been successfully shared. If the cross authentication processing and the session key sharing processing are successfully performed, the processing proceeds to Step S423.

If the cross authentication processing and the session key sharing processing fail, the processing is completed without executing the processing in Step S423 and the following steps.

In such a case, the content reproduction processing by the host device is stopped.

Step S423

If the cross authentication processing and the session key (Bk) sharing processing are successfully performed in Step S421, an authentication session, namely a data processing sequence, to which the session key (Bk) generated in the authentication processing in Step S421 is applied, is started in Step S423.

Step S424

Next, the medium receives a random number (Nonce), which has been generated by the host device, from the host device in Step S424.

The processing corresponds to the processing in Step S203 in the sequence diagram in FIG. 6.

Step S425

Next, the medium calculates a verification value (MAC) based on the random number (Nonce) which has been received from the host device and the host device ID which has been stored on the storage unit of the medium in Step S408 in the flow of FIG. 11 described above and transmits the calculated verification value (MAC) along with the host device ID to the host device in Step S425.

The processing corresponds to the processing in Steps S204 and S205 in the sequence diagram of FIG. 6.

Thereafter, the host device executes verification processing by applying the verification value (MAC) and the host device ID which have been received from the medium, namely the verification processing in Step S206 in FIG. 6.

If it is determined by the verification processing that no change has been made in the connection relationship between the host device and the medium, the content reproduction is continued. If the verification has not been established, the content reproduction is stopped.

5-3. Deregistration Processing for Deleting ID of Host Device which has been Recorded as Content Reproduction Permitted Device in Medium Next, a description will be given of a processing sequence on the side of the medium, which is executed in the deregistration processing for deleting the host device ID of the host device recorded as the content reproduction permitted device in the medium, with reference to FIG. 13.

The processing corresponds to the processing on the side of the medium in the sequence diagram described above with reference to FIG. 7.

The processing shown in FIG. 13 is processing executed by the medium which is mounted on the medium interface on the host device and stores the content to be reproduced. The processing is executed under the control of the data processing unit such as the CPU with the program executing function based on the reproduction processing program stored on the memory of the medium, for example.

Hereinafter, the respective processing steps will be sequentially described.

Step S451

First, the medium which stores the host device ID of the host device as the reproduction permitted device executes authentication processing with the host device which is connected via the medium interface in Step S451.

Figure 7:
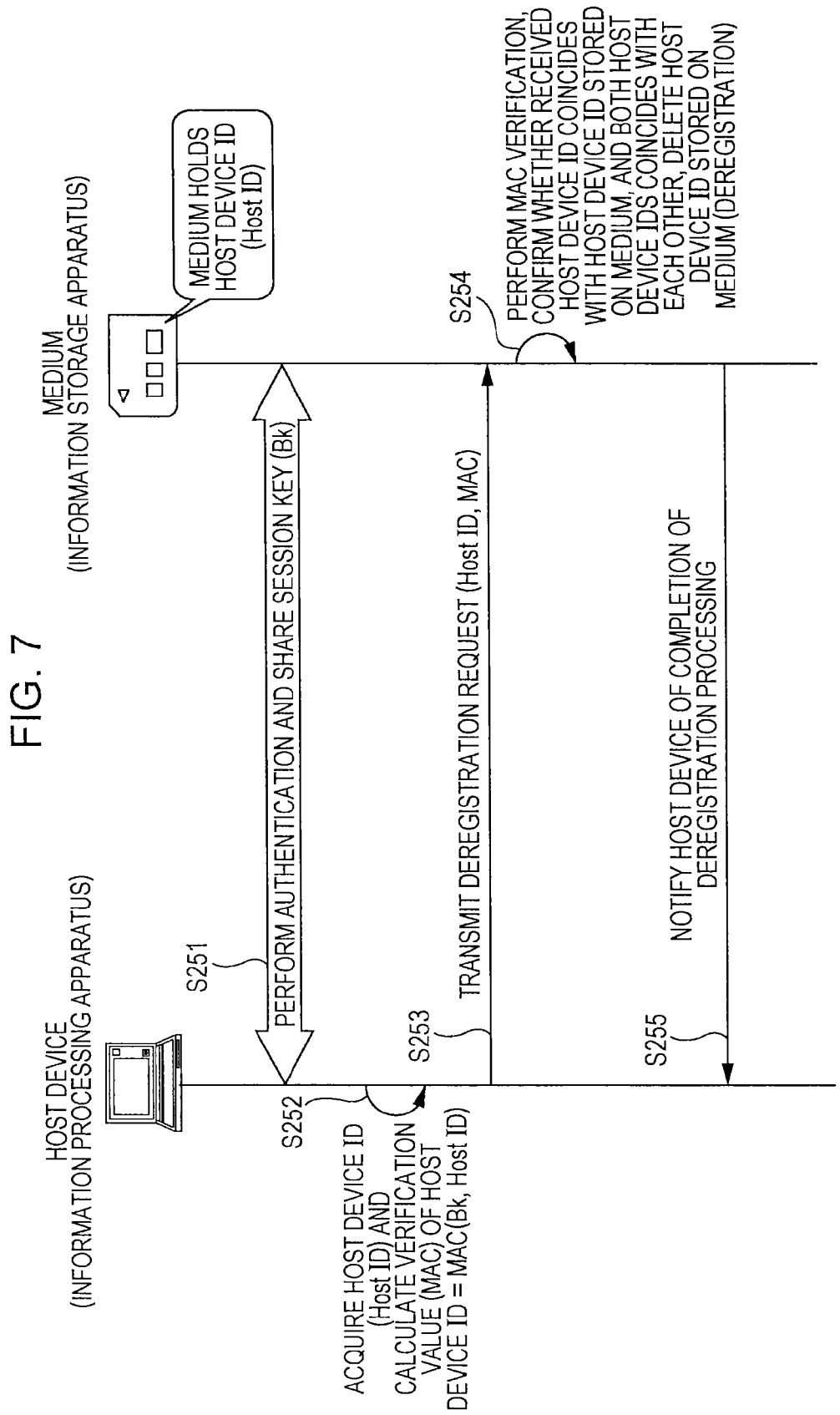
FIG. 7 is a diagram illustrating a sequence of processing for deregistering the host device which has been registered as a reproduction permitted device in the medium.

The processing corresponds to the processing in Step S251 in the sequence diagram shown in FIG. 7.

That is, the host device and the medium execute cross authentication processing for confirming reliability of counterpart devices and session key (=bus key: Bk) sharing processing.

Step S452

In Step S452, it is determined whether or not the authentication in Step S451 has been established and the session key (Bk) has been successfully shared. If the cross authentication processing and the session key sharing processing are successfully performed, the processing proceeds to Step S453.

If the cross authentication processing and the session key sharing processing fail, the processing is completed without executing the processing in Step S453 and the following steps.

Step S453

If the cross authentication processing and the session key (Bk) sharing processing are successfully performed in Step S451, an authentication session, namely a data processing sequence, to which the session key (Bk) generated in the authentication processing in Step S451 is applied, is started in Step S453.

Step S454

Next, the medium receives a deregistration request with the host device ID and the verification value (MAC) generated based on the host device ID from the host device in Step S454.

The processing corresponds to the processing in Step S253 in the sequence diagram of FIG. 7.

Steps S455 and S456

Next, the medium executes MAC verification based on the MAC which is a verification value received from the host device in Step S455.

The processing corresponds to the processing in Step S254 in the sequence diagram of FIG. 7.

The medium calculates the MAC value for the host device ID (Host ID) received from the host device and confirms whether or not the calculated MAC value coincides with the received MAC value received from the host device.

If the calculated MAC value coincides with the received MAC value, it is determined that the MAC verification has been established. A result of the determination in Step S456 is Yes, and the processing proceeds to Step S457.

If the calculated MAC value does not coincide with the received MAC value, it is determined that the MAC verification has not been established. The result of the determination in Step S456 is No, and the processing is completed.

Step S457

If it is determined that the MAC verification has been established and the reliability of the host ID received from the host device has been confirmed in Steps S455 and S456, the medium confirms whether or not the host device ID which has been received from the host device coincides with the host device ID which has been already stored on the storage unit of the medium in Step S457.

If the host device ID which has been received from the host device coincides with the host device ID which has been already stored on the storage unit of the medium, it is determined that the deregistration request is a deregistration request from a proper host device which has been registered as the content reproduction permitted device in the medium, and the processing proceeds to Step S458.

On the other hand, if the host device ID which has been received from the host device does not coincide with the host device ID which has been already stored on the storage unit of the medium, it is determined that the deregistration request is not a deregistration request from a proper host device registered as the content reproduction permitted device in the medium. The processing proceeds to Step S459, the session is completed, and the processing is completed without deleting the host device ID registered in the medium and executing the deregistration processing.

Step S458

If it is determined that the MAC verification has been successfully performed in Step S456 and it is determined that the host device ID received from the host device coincides with the host device ID recorded in the medium in Step S457, the medium deletes the host device ID which has been recorded as the content reproduction permitted device information on the storage unit of the medium in Step S458. That is, the medium executes the deregistration processing.

Furthermore, the medium notifies the host device of the completion of the deregistration processing.

The processing in Step S458 corresponds to the processing in Steps S254 and S255 in the sequence diagram shown in FIG. 7.

Step S459

Next, the medium completes the authentication session in a state where the session key is shared by the host device and the medium in Step S459. When the authentication session is completed, the session key (Bk) shared by the host device and the medium is also abandoned.

By the medium performing the processing based on the flow in FIG. 13, the host device ID recorded in the medium is deleted.

Therefore, if a new host device executes the registration processing based on the sequence shown in FIG. 5 thereafter, a recorded host device ID is not present in the medium, and it is possible to register a host device ID of the new host device as a new content reproduction permitted device in the medium.

That is, a result of the determination processing in Step S407 in the flow shown in FIG. 11 is Yes, and it is possible to smoothly register the new host device as a new content reproduction permitted device.

6. Concerning Specific Application Examples of Processing According to the Present Disclosure The processing according to the present disclosure realizes such content use control that a host device which reproduces content stored on the medium is limited to a single host device with a host device ID registered in the medium.

In order to perform such processing, the host device ID is transmitted from the host device to the medium, and the host device ID registration processing for storing the host device ID on the storage unit of the medium is executed before the start of the content reproduction.

Thereafter, the processing for confirming connection consistency between the host device and the medium is periodically executed during the content reproduction by the host device. The processing for confirming connection consistency is executed as processing for monitoring that there is no change in the connection relationship between the host device which executes the content reproduction and the medium.

Hereinafter, a description will be given of specific examples, to which the processing according to the present disclosure is applied in various kinds of content reproduction processing.

Figure 16:
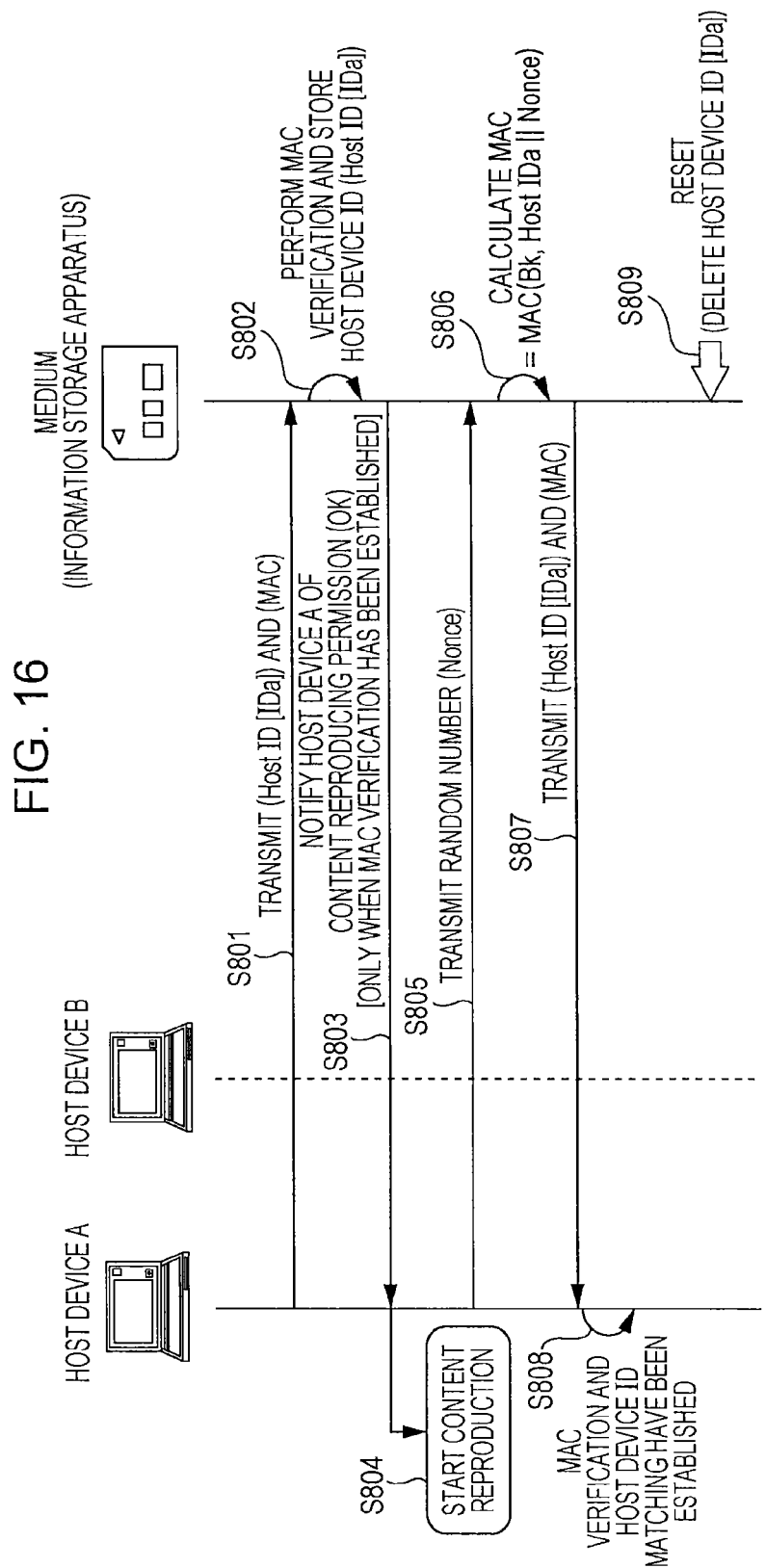
FIG. 16 is a diagram illustrating a specific example of the processing sequence which is executed between the host device (information processing apparatus) for reproducing content and the medium (information storage apparatus)
Figure 17:
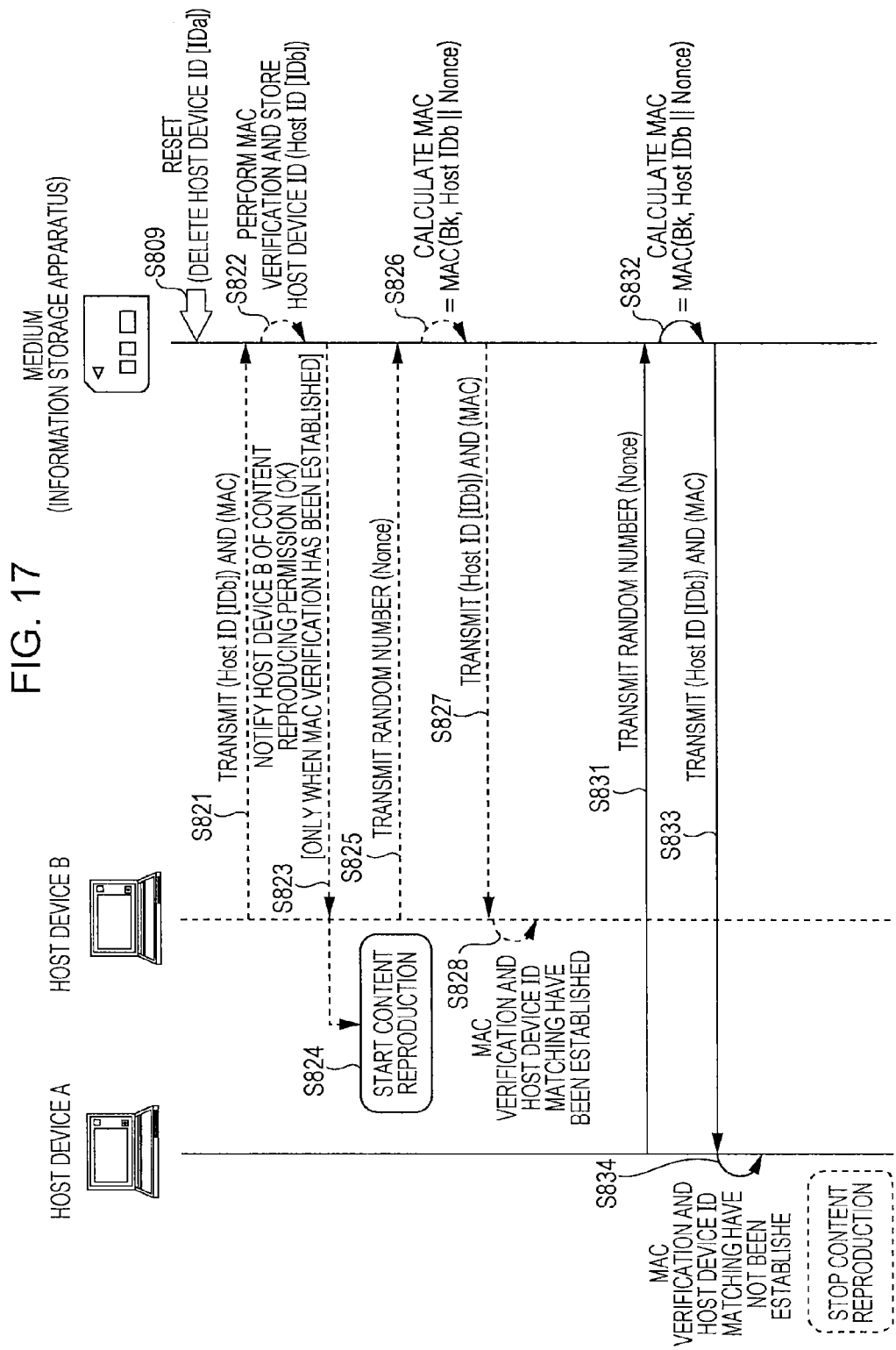
FIG. 17 is a diagram illustrating a specific example of the processing sequence which is executed between the host device (information processing apparatus) for reproducing content and the medium (information storage apparatus)

Here, the following three reproduction processing examples will be described.
(1) Processing example in which one host device reproduces content by applying a plurality of content reproducing applications (FIG. 14)
(2) Processing example when a plurality of host devices attempt to reproduce content from one medium in parallel (FIG. 15)
(3) Processing example when a plurality of host devices attempt to reproduce content from one medium in sequential manner (FIGS. 16 and 17)

Hereinafter, the three content reproduction processing examples will be sequentially described.

6-1. Processing Example in which One Host Device Reproduce Content by Applying a Plurality of Content Reproducing Applications First, a description will be given of the following content reproduction processing example with reference to a sequence diagram shown in FIG. 14.
(1) Processing Example in which One Host Device Reproduces Content by Applying a Plurality of Content Reproducing Applications This is a processing example in a case where two different available content reproducing applications are present in one host device and the applications are switched and used.

Specifically, there is a host device with two different available content reproducing applications, namely a reproducing application A and a reproducing application B, and the host device performs the processing for reproducing the content read from the single medium by appropriately switching the two reproducing applications.

If the processing according to the present disclosure is applied thereto, such content reproduction by the same host device switching a plurality of applications is permitted. That is, if a host device ID is registered in the medium, all the applications can reproduce the content under condition of the registration.

According to the processing of the present disclosure, determination on whether or not to permit the host device to reproduce the content is executed based on determination on whether or not the host device is a host device with a host device ID which coincides with the host device ID registered in the medium. Therefore, applications executed by the host device are not limited, and all the applications are permitted to reproduce the content stored on the medium as long as the host device is a host device with the host device ID which coincides with the host device ID registered in the medium.

Figure 14:
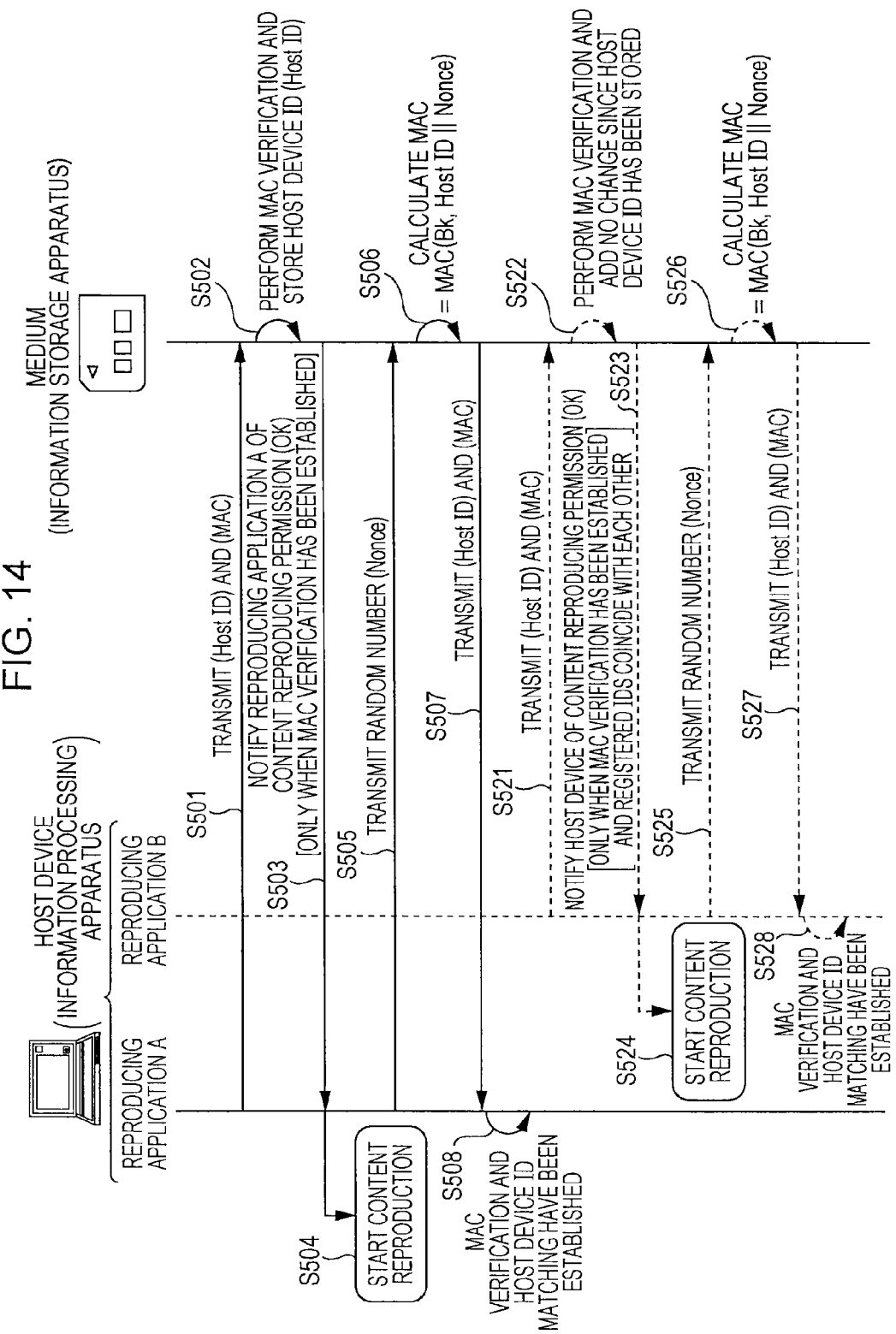
FIG. 14 is a diagram illustrating a specific example of the processing sequence which is executed between the host device (information processing apparatus) for reproducing content and the medium (information storage apparatus)

In the sequence diagram shown in FIG. 14, the processing in Steps S501 to S507 is processing of the application A, and the processing in Steps S521 to S527 is processing of the application B executed in the same host device.

Hereinafter, the processing will be sequentially described.

In addition, it is assumed that the authentication between the host device and the medium and the sharing of the session key have been performed before the processing in Step S501 and the authentication session between the host device and the medium has been set. Steps S501 to S503

Steps S501 to S503 are processing of the reproducing application A of the host device and correspond to the sequence of the processing for registering the host device described above with reference to FIGS. 5, 8, and 11.

First, the application A transmits a host device ID (Host ID) and a verification value (MAC) generated by applying a session key (Bk) to the host device ID to the medium in Step S501.

Next, the medium executes verification of the MAC received from the host device and confirms by the MAC verification that there is no error in data on the host device ID in Step S502. Thereafter, the medium confirms whether or not a different host device ID (Host ID) has not been stored on the storage unit in the medium.

In this example, it is assumed that a different host device ID (Host ID) has not been stored on the storage unit in the medium. After the confirmation, the medium stores the host device ID (Host ID), which has been received from the host device, on the storage unit in the medium.

By the processing, the host device which executes the application A is registered as a single host device permitted to reproduce the content stored on the medium.

In addition, the processing in Step S502 is processing corresponding to the processing in Step S104 shown in FIG. 5, which is processing corresponding to Steps S405 to S408 in the flowchart shown in FIG. 11.

Next, the medium notifies the application A in the host device of the content reproducing permission in Step S503. Step S504

After the completion of the host device registration in Steps S501 to S503, the application A executed in the host device reads, decodes, and reproduces the content in the medium.

In addition, the content reproduction processing is performed by executing the processing for preparing for the content reproduction based on the flowchart shown in FIG. 9 described above. Steps S505 to S508

Steps S505 to S508 is processing for confirming connection consistency between the host device and the medium, which is performed during the content reproduction by the reproducing application A of the host device. That is, Steps S505 to S508 corresponds to the processing based on the sequence described above with reference to FIGS. 6, 10, and 12.

First, the application A of the host device generates a random number (Nonce) and transmits the random number (Nonce) to the medium in Step S505.

Next, the medium executes processing for generating a verification value (MAC) by applying the host device ID (Host ID) stored on the storage unit of the medium and the session key (Bk) for the random number (Nonce) in Step S506.

Furthermore, the medium transmits the host device ID (Host ID) stored on the storage unit of the medium and the verification value (MAC) generated in Step S506 to the application A of the host device in Step S507.

Then, the application A of the host device executes verification of the MAC received from the medium, confirms that the MAC verification has been established, and then further executes matching processing for confirming whether or not the host device ID (Host ID) received from the medium coincides with the host device ID (Host ID) of the host device itself Step S508. The processing corresponds to the processing in Step S206 in the sequence diagram of FIG. 6 and the processing in Steps S387 and S388 in the flowchart of FIG. 10.

The application A of the host device continues the content reproduction only when both the MAC verification and the host device ID matching have been established. Steps S521 to S523

The processing in Step S521 and the following steps, namely the processing in Steps S521 to S5258 is processing executed by the application B, which is a new content reproducing application, in the host device which executes the aforementioned application A.

In addition, the applications A and B are executed in one host device. These two applications are executed in parallel in some cases and executed in a switching manner in other cases.

Steps S521 to S523 are processing of the reproducing application B of the host device, which is processing corresponding to the sequence of the processing for registering the host device described above with reference to FIGS. 5, 8, and 11.

First, the application B transmits the host device ID (Host ID) and the verification value (MAC) generated by applying the session key (Bk) to the host device ID to the medium in Step S521.

Then, the medium executes verification of the MAC received from the host device and confirms that there is no error in data on the host device ID in Step S522. Thereafter, the medium confirms whether or not a different host device ID (Host ID) has been stored on the storage unit in the medium.

At this time, a host device ID (Host ID) has been already stored on the storage unit in the medium. That is, the host device ID registered in the processing for registering the host device, which was executed by the application A in Step S502, has been stored. The host device ID stored on the storage unit of the medium is the host device ID (Host ID) of the same host device which is a subject of executing the applications A and B.

If a host device ID (Host ID) has been already stored on the storage unit of the medium, the medium does not register a new host device ID. That is, the medium does not execute processing for rewriting a host device ID in the storage unit.

The medium confirms whether the host device ID (Host ID), for which the MAC verification has been established, coincides with the host device ID (Host ID) which has been stored on the storage unit of the medium in Step S522. Under the condition that the host device IDs coincide with each other, the medium moves on to Step S523 and notifies the application B in the host device of the content reproducing permission.

The processing is processing corresponding to the processing in Steps S405 to S408 in the flowchart of FIG. 11.

As described above, content reproducing permission is provided to both the different applications as long as the applications are executed in the same host device. That is, the medium does not stop content reproduction of the host device with the host device ID which has been registered in the medium if the content reproducing applications are switched.
Step S524

After the completion of the host device registration in Steps S521 to S523, the application B executed in the host device reads, decodes, and reproduces the content in the medium.

In addition, the content reproduction processing is performed by executing the processing for preparing for the content reproduction based on the flowchart shown in FIG. 9 described above. Steps S525 to S528

Steps S525 to S528 are processing for confirming connection consistency between the host device and the medium, which is executed by the reproducing application B of the host device during the content reproduction. That is, Steps S525 to S528 correspond to the processing based on the sequence described above with reference to FIGS. 6, 10, and 12.

First, the application B of the host device generates a random number (Nonce) and transmits the random number (Nonce) to the medium in Step S525.

Next, the medium executes processing for generating a verification value (MAC) by applying the host device ID (Host ID) stored on the storage unit of the medium and the session key (Bk) for the random number (Nonce) in Step S526.

Furthermore, the medium transmits the host device ID (Host ID) stored on the storage unit of the medium and the verification value (MAC) generated in Step S526 to the application B of the host device in Step S527.

Then, the application B of the host device executes verification of the MAC received from the medium, confirms that the MAC verification has been established, and then further executes matching processing for confirming whether or not the host device ID (Host ID) received from the medium coincides with the host device ID (Host ID) of the host device itself in Step S528. The processing corresponds to the processing in Step S206 in the sequence diagram of FIG. 6 and the processing in Steps S387 and S388 in the flowchart of FIG. 10.

The verification processing executed by the application B in Step S206, namely both the MAC verification and the host device ID matching are established, and the content reproduction can be continued.

If different applications are executed in the same host device as described above, the content reproducing permission is provided to both the applications, and the medium does not stop the content reproduction by the host device with the host device ID which has been registered in the medium even if the content reproducing applications are switched.

6-2. Processing Example when a Plurality of Host Devices Attempt to Reproduce Content from One Medium in Parallel Next, a description will be given of the following content reproduction processing example with reference to a sequence diagram shown in FIG. 15.

Figure 15:
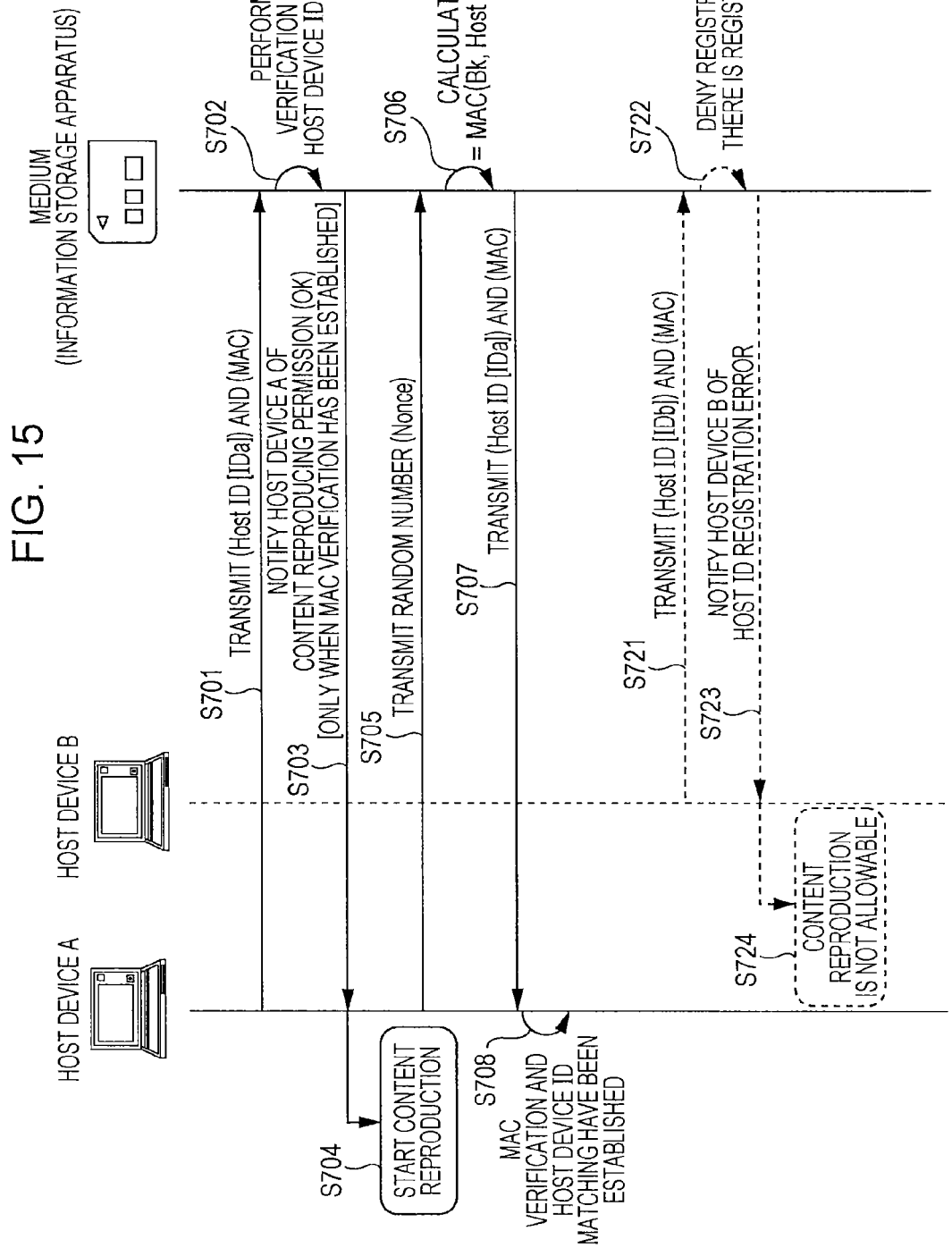
FIG. 15 is a diagram illustrating a specific example of the processing sequence which is executed between the host device (information processing apparatus) for reproducing content and the medium (information storage apparatus)

(2) Processing Example when a Plurality of Host Devices Attempt to Reproduce Content from One Medium in Parallel This is a processing example in a case where a plurality of different host devices, namely a host device A and a host device B shown in FIG. 15 attempt to reproduce content stored on the same medium.

If the processing according to the present disclosure is applied, such parallel reproduction of the content stored on the same medium by different host devices is not permitted.

If the processing according to the present disclosure is applied, reproduction of the content stored on the medium is limited to one host device, namely a host device with the same host device ID as the host device ID registered in the medium. Therefore, two host devices are not permitted to simultaneously reproduce content from a single medium.

In the sequence diagram shown in FIG. 15, processing in Steps S701 to S707 is processing of the host device A, and processing in Steps S721 to S724 is processing of the host device B.

Hereinafter, the processing will be sequentially described.

In addition, it is assumed that authentication and session key sharing between the host device A and the medium have been performed and an authentication session between the host device A and the medium has been set before the processing in Step S701.

Similarly, it is assumed that authentication and session key sharing between the host device B and the medium have been performed and an authentication session between the host device B and the medium has been set before Step S721.

Steps S701 to S708

Steps S701 to S708 are processing of the host device A. The processing is the same processing as the processing in Steps S501 to S508 described above with reference to FIG. 14. That is, the following processing is sequentially executed.

(a) Steps S701 to S703: Processing for Registering Host Device

This processing corresponds to the sequence of the processing for registering the host device described above with reference to FIGS. 5, 8, and 11.

By the processing, a host device ID-a (Host ID-a) which is an identifier of the host device A is registered in the medium.

That is, the host device A is registered as a host device permitted to reproduce the content.

(b) Step S704: Processing for Reproducing Content

This processing is processing for reading, decoding, and reproducing the content in the medium and is performed by executing the processing for preparing for content reproduction based on the flowchart shown in FIG. 9.

(c) Steps S705 to S708: Processing for Confirming Connection Consistency Between Host Device and Medium This processing corresponds to the processing based on the sequence described above with reference to FIGS. 6, 10, and 12.

It is assumed that the host device A continuously reads and reproduces the content from the medium after Step S708.

It is also assumed that the host device B which is connected along with the host device A executes the processing in Step S721 and the following steps on the medium which stores the content to be reproduced during the period of executing the processing for reproducing the content by the host device A.

It is also assumed that the host device B has been executed the authentication processing with the medium before the execution of Step S721 and the authentication processing and the session key (Bk) sharing have been successfully performed as described above.

Steps S721 to S723

Steps S721 to S723 are processing of the host device B, which is processing corresponding to the sequence of the processing for registering the host device described above with reference to FIGS. 5, 8, and 11.

First, the host device B transmits a host device ID-b (Host ID-b) and a verification value (MAC) generated by applying the session key (Bk) to the host device ID-b to the medium in Step S721.

Then, the medium executes verification of the MAC received from the host device and confirms that there is no error in data on the host device ID in Step S722. Thereafter, the medium confirms whether a different host device ID (Host ID) has been stored on the storage unit in the medium.

At this time, the host device ID-a (Host ID-a) has been already stored on the storage unit in the medium. That is, the host device ID-a registered in the processing for registering the host device which was executed by the host device A in Step S702 has been already stored.

The host device ID-a stored on the storage unit of the medium is a host device ID which is different from the host device ID-b received from the host device B in Step S721.

In such a case, the medium does not execute processing for registering the host device ID-b which has been received from the host device B.

That is, if a host device ID of a host device as a content reproduction permitted device has been already registered and stored on the storage unit of the medium, the medium maintains the registered host device ID and does not change the host device ID to a new host device ID and does not execute processing for additionally registering the new host device ID.

In such a case, the medium does not register the host device ID-b (Host ID-b) in the medium in Step S722 and does not notify the host device B of the content reproducing permission in Step S723. For example, the medium notifies the host device B of a host ID registration error and then completes the authentication session with the host device B.

The processing is processing corresponding to processing for moving on from Step S407 to Step S409 after a determination of No in the determination processing in Step S407 in the flow shown in FIG. 11 described above.

The host device B is not permitted to reproduce the content as shown in the subsequent Step S724, and does not execute the content reproduction from the medium.

By applying the processing according to the present disclosure as described above, the reproduction of content from the medium can be limited to a single host device with a host device ID registered as a content reproduction permitted host in the medium.

6-3. Processing Example when a Plurality of Host Devices Attempt to Reproduce Content from One Medium in Sequential Manner Next, a description will be given of the following content reproduction processing example with reference to sequence diagrams shown in FIGS. 16 and 17, (3) Processing Example when a Plurality of Host Devices Attempt to Reproduce Content from One Medium in Sequential Manner This is a processing example in a case where a plurality of different host devices, namely the host device A and the host device B shown in FIG. 15 attempt to reproduce content stored on the same medium in the same manner as described above with reference to FIG. 15.

However, this is processing that the host device B executes the content reproduction after the medium is reset after the start of the reproduction by the host device A instead of processing that the host devices A and B attempt to simultaneously reproduce the content.

If the processing according to the present disclosure is applied, parallel reproduction of content stored on the same medium by different host devices is not executed as described above.

However, if the host device ID (Host ID-a) of the host device A which has been registered as the content reproduction permitted device in the medium is deleted (reset) and the host device ID (Host ID-b) of the host device B is newly registered thereafter, the host devices A and B can sequentially execute the content reproduction from the same medium.

That is, host devices can be switched for the sequential processing instead of the parallel processing although a plurality of host devices are not permitted to simultaneously reproduce the content from the same medium in parallel.

The processing sequences shown in FIGS. 16 and 17 correspond to the processing example in which the different host devices sequentially execute the content reproduction from the same medium.

In the sequence diagrams shown in FIGS. 16 and 17, processing in Steps S801 to S807 shown in FIG. 16 is processing of the host device A, and processing in Steps S821 to S824 shown in FIG. 17 is processing of the host device B.

Furthermore, processing in Steps S831 to S834 shown in FIG. 17 is processing of the host device A.

In addition, processing in Step S809 shown in FIG. 16 is processing on the side of the medium, and the processing for resetting the medium, namely, the processing for deleting the host device ID as information on the content reproduction permitted host device which has been registered in the medium is performed in Step S809.

By deleting the registered ID, the host device ID-a (Host ID-a) of the host device A is deleted from the storage unit of the medium.

By deleting the registration, another host device ID, namely the host device ID-b (Host ID-b) of the host device B can be registered in the storage unit of the medium.

Hereinafter, the processing shown in FIGS. 16 and 17 will be sequentially described.

In addition, it is assumed that authentication and session key sharing between the host device A and the medium have been performed and an authentication session between the host device A and the medium has been set before the processing in Step S801.

Similarly, it is assumed that authentication and session key sharing between the host device B and the medium have been performed and an authentication session between the host device B and the medium has been set before Step S821.

Steps S801 to S808

Steps S801 to S808 are processing of the host device A. The processing is the same processing as the processing in Steps S501 to S508 described above with reference to FIG. 14. That is, the following processing is sequentially executed.

(a) Steps S801 to S803: Processing for registering host device

This processing corresponds to the sequence of the processing for registering the host device described above with reference to FIGS. 5, 8, and 11.

By the processing, a host device ID-a (Host ID-a) which is an identifier of the host device A is registered in the medium.

That is, the host device A is registered as a host device permitted to reproduce the content.

(b) Step S804: Processing for reproducing content

This processing is processing for reading, decoding, and reproducing the content in the medium and is performed by executing the processing for preparing for content reproduction based on the flowchart shown in FIG. 9.

(c) Steps S805 to S808: Processing for confirming connection consistency between host device and medium This processing corresponds to the processing based on the sequence described above with reference to FIGS. 6, 10, and 12.

After the step S808, the host device A can continuously read and reproduce the content from the medium.

In this processing example, the processing in Step S809 is executed on the medium during the period, for which the host device A is permitted to execute the content reproduction processing.

The processing in Step S809 is processing on the side of the medium, and processing for resetting the medium, namely processing for deleting the host device ID as information on the content reproduction permitted host device which has been registered in the medium is performed in Step S809.

By deleting the registered ID, the host device ID-a (Host ID-a) of the host device A is deleted from the storage unit of the medium.

After the processing in Step S809, processing in Step S821 and the following steps shown in FIG. 17 is executed as the processing of the host device B.

The processing will be described below.

Step S821 to S828

Steps S821 to S828 is processing of the host device B. The processing is processing corresponding to the sequence of the processing for registering the host device described above with reference to FIGS. 5, 8, and 11.

First, the host device B transmits the host device ID-b (Host ID-b) and the verification value (MAC) generated by applying the session key (Bk) to the host device ID-b to the medium in Step S821.

Then, the medium executes verification of the MAC received from the host device and confirms that there is no error in data on the host device ID in Step S822. Thereafter, the medium confirms whether a different host device ID (Host ID) has not been stored on the storage unit in the medium.

By the reset processing in Step S809, the host device ID-a (Host ID-a) recorded in the storage unit in the medium has been deleted. At present, there is no host device which is registered as the content reproduction permitted device.

That is, a result of the determination in Step S407 shown in the flow of FIG. 11 is No, and the processing for registering the host device ID in Step S408 is executed.

In Step S822, the medium registers the host device ID-b (Host ID-b), which has been received from the host device B, as an ID of a single host device permitted to reproduce the content. That is, the host device ID-b (Host ID-b) is stored on the storage unit of the medium.

Thereafter, the medium notifies the host device B of the content reproducing permission in Step S823.

The host device B starts the content reproduction in the subsequence Step S824.

The processing is processing for reading, decoding, and reproducing the content in the medium, and is performed by executing the processing for preparing for the content reproduction based on the flowchart shown in FIG. 9.

Furthermore, the host device B executes the processing for confirming connection consistency between the host device and the medium in Steps S825 to S828. The processing corresponds to the processing based on the sequence described above with reference to FIGS. 6, 10, and 12.

As described above, the host device B can reproduce the content from the same medium after the host device A reproduces the content.

Steps S831 to S834

As processing in Step S831 and the following steps, a processing example in a case where the processing for confirming connection consistency between the host device and the medium is executed by the host device A in a state where the host device B is permitted to reproduce the content will be described.

In Step S831, the host device A generates a random number (Nonce) and transmits the random number (Nonce) to the medium.

Then, the medium executes the processing for generating the verification value (MAC) by applying the host device ID (Host ID) stored on the storage unit of the medium and the session key (Bk) for the random number (Nonce) in Step S832.

At this time, the host device ID-b (Host ID-b) of the host device B has been recorded as information on the content reproduction permitted device in the medium.

Therefore, the medium executes the processing for generating the verification value (MAC) by applying the host device ID-b (Host ID-b) of the host device B and the session key (Bk) for the random number (Nonce).

Next, the medium transmits the host device ID-b (Host ID-b) stored on the storage unit of the medium and the verification value (MAC) generated in Step S832 to the host device A in Step S833.

Next, the host device A executes verification of the MAC received from the medium, confirms that the MAC verification has been established, and then further executes matching processing for confirming whether or not the host device ID-b (Host ID-b) received from the medium coincides with the host device ID of itself, namely the host device ID-a (Host ID-a) in Step S834.

However, the host device ID-b (Host ID-b) received from the medium does not coincide with the host device ID of itself, namely the host device ID-a (Host ID-a) in the verification processing executed by the host device A. Therefore, the matching processing is not established.

As a result, the reproduction of the content from the medium by the host device A is stopped at this time.

In addition, the processing corresponds to the processing in a case where the processing in Step S387 in the flowchart shown in FIG. 10 is executed and a determination of No is obtained in the determination processing in Step S388.

By applying the processing according to the present disclosure as described above, the reproduction of the content from the medium can be limited to a single host device with a host device ID which has been registered as an ID of a content reproduction permitted host in the medium.

7. Concerning Other Embodiments

According to the aforementioned embodiment, the host device which can reproduce the content stored on the medium is a single host device with the host device ID which has been registered in the medium.

However, another configuration in which the number of the host device IDs which can be registered as IDs of the content reproduction permitted hosts in the medium is two or more instead of one is also applicable.

For example, when the number of the host device IDs which can be registered as IDs of the content reproduction permitted hosts in the medium is n, n or less different host devices can reproduce the content stored in the same medium in parallel.

Hereinafter, a description will be given of an example in which an upper limit number (n) of the host devices which can simultaneously reproduce content is defined and n host devices, which are not more than the prescribed upper limit number, are permitted to reproduce the content.

A description will be given of a processing sequence on the side of the medium in the processing for registering the host device in a case of such setting with reference to a flowchart shown in FIG. 18.

Figure 18:
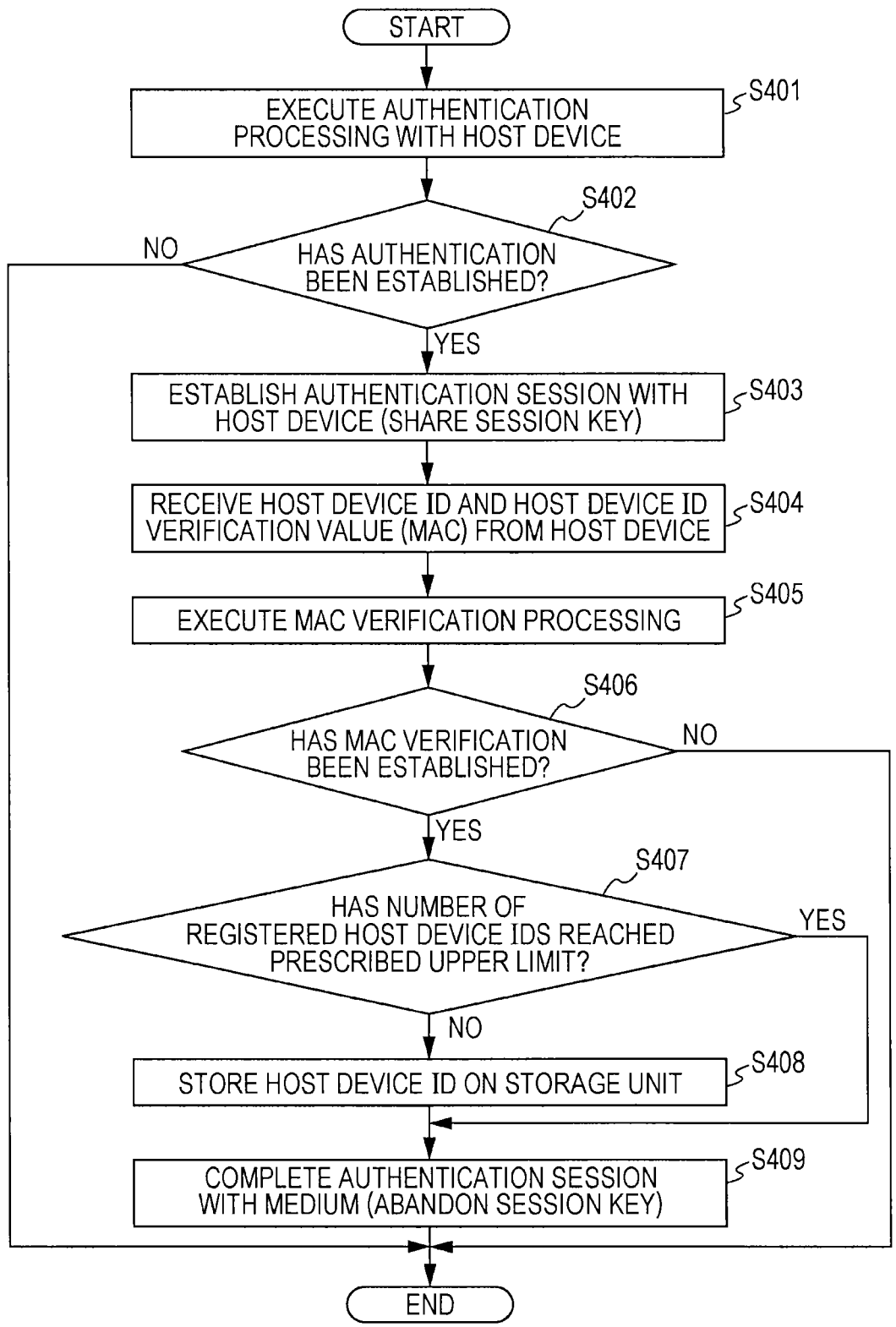
FIG. 18 is a diagram showing a flowchart for illustrating processing which is executed by the medium in a case where a plurality of host devices can be registered in the sequence of the host derive registration processing.

The flow shown in FIG. 18 is a flow for illustrating processing of receiving a host device ID (Host ID) from the host device and storing the received host device ID as information for identifying the content reproduction permitted host device on the storage unit of the medium, in the same manner as the flow described above with reference to FIG. 11.

In the processing described above with reference to FIG. 11, the processing of not registering a new host device ID in a case where an already registered host device ID (Host ID) is present in the storage unit of the medium is executed in Step S407.

On the other hand, different processing from the processing in Step S407 shown in FIG. 11 is performed in the flow shown in FIG. 18. Other steps are the same processing as that in the respective steps in FIG. 11.

In the flow shown in FIG. 18, the medium confirms the number of registered host device IDs (Host ID) as information on the content reproduction permitted host devices stored on the storage unit of the medium in Step S407.

That is, the medium determines whether or not the number of registered host device IDs has reached the prescribed number (n) of the host devices permitted to reproduce content in parallel.

If the number of registered host device IDs in the medium has not reached the prescribed number (n) of the parallel reproduction permitted host devices, a result of the determination in Step S407 is No, and a new host device ID (Host ID) is additionally registered as an ID of a content reproduction permitted host in Step S408.

That is, the medium sets the number of host devices permitted to reproduce content in parallel to (n) and executes new additional registration until the number of registered host device ID in the medium reaches (n).

By such processing, the content in the medium can be simultaneously reproduced in parallel by the prescribed number (n) of host devices.

The following processing for confirming connection consistency between the host device and the medium, which is executed between the respective host devices and the medium, namely the processing described above with reference to FIG. 6 is individually executed between the respective host devices and the medium.

In such a case, it is necessary for the medium to determine which content reproduction permitted host the host device attempting to execute the processing for confirming connection consistency is, acquire a host device ID (Host ID) of the determined host device from the storage unit, generate verification value therefor, and transmit the verification value to the host device.

The processing for determining the host device can be executed by applying the host certificate which is received from the host device in the authentication processing in Step S201 in the sequence diagram shown in FIG. 6, for example.

Specifically, the medium associates and stores host identifier information recorded in the host certificate with the host device ID (Host ID) received from the host device on the storage unit in performing the processing for registering the host device ID.

In executing the processing for confirming connection consistency, the medium identifies the host device, which attempts to execute the processing for confirming connection consistency, based on the correspondence relationship, acquires the host device ID (Host ID) corresponding to the host device in accordance with the identification result, generates a verification value, and transmits the verification value to the host device.

By performing such processing, it is possible to set the number of devices capable of executing content reproduction in parallel to an arbitrary number (n) and perform the content use control.

8. Concerning Hardware Configuration Examples of Respective Apparatuses

Finally, a description will be given of hardware configuration examples of the respective apparatuses which execute the aforementioned processing with reference to FIGS. 19 and 20.

Figure 19:
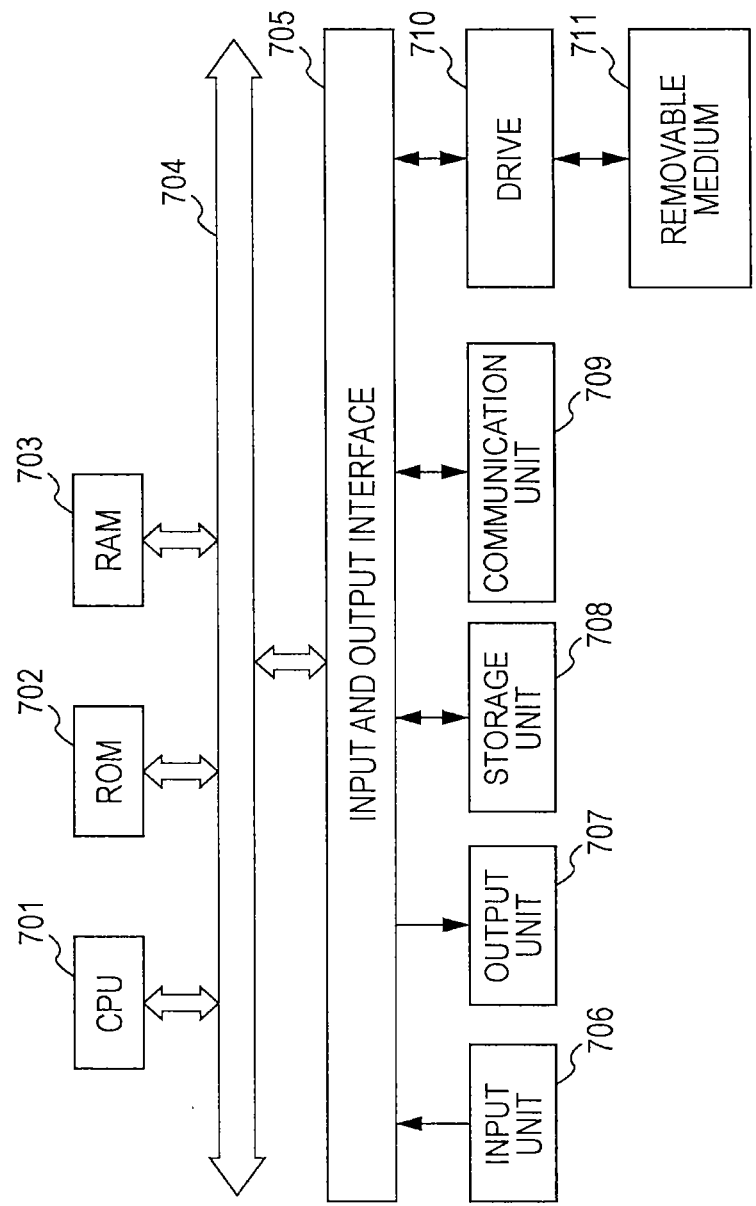
FIG. 19 is a diagram illustrating a hardware configuration example of the host device (information processing apparatus)

FIG. 19 shows a hardware configuration example of an information processing apparatus which reproduces content from a medium.

A Central Processing Unit (CPU) 701 functions as a data processing unit which executes various kinds of processing based on programs stored on a Read Only Memory (ROM) 702 or a storage unit 708. For example, the CPU 701 executes the processing based on the aforementioned sequences. A Random Access Memory (RAM) 703 stores programs executed by the CPU 701, data, and the like. The CPU 701, the ROM 702, and the RAM 703 are connected to each other via a bus 704.

The CPU 701 is connected to an input and output interface 705 via the bus 704, and an input unit 706 which is configured by various switches, a keyboard, a mouse, a microphone, and the like and an output unit 707 which is configured by a display, a speaker, and the like are connected to the input and output interface 705. The CPU 701 executes various kinds of processing in response to instructions input from the input unit 706 and outputs processing results to the output unit 707, for example.

The storage unit 708 connected to the input and output interface 705 is configured by a hardware disk, for example, and stores programs executed by the CPU 701 and various kinds of data thereon. A communication unit 709 communicates with external apparatuses via a network such as the Internet or a local area network.

A drive 710 connected to the input and output interface 705 drives a removable medium 711 such as a magnetic disk, an optical disc, a magnet-optical disc, or a semiconductor memory such as a memory card and acquires various kinds of data such as content and key information recorded therein. For example, processing for decoding and reproducing content is performed based on a reproduction program executed by the CPU by using the acquired content and the key data.

FIG. 20 shows a hardware configuration example of the medium as an information storage apparatus, such as a memory card.

A Central Processing Unit (CPU) 801 functions as a data processing unit which executes various kinds of processing based on programs stored on a Read Only Memory (ROM) 802 or a storage unit 807. For example, the CPU 801 executes communication processing with the host device described in the aforementioned respective embodiments, processing for writing data in the storage unit 807 and reading data from the storage unit 807, and the like. A Random Access Memory (RAM) 803 appropriately stores programs executed by the CPU 801, data, and the like thereon. The CPU 801, the ROM 802, and the RAM 803 are connected to each other via a bus 804.

The CPU 801 is connected to an input and output interface 805 via the bus 804, and a communication unit 806 and the storage unit 807 are connected to the input and output interface 805.

The communication unit 804 connected to the input and output interface 805 communicates with a server and a host, for example. The storage unit 807 is a data storage region and includes a protection region 811, the access to which is limited as described above, and a general region 812, in and from which data can be freely written and read.

9. Overview of Configuration According to the Present Disclosure

As described above, the embodiments of the present disclosure were described in detail with reference to specific embodiments. However, it is obvious that modifications and replacements can be made by those skilled in the art without departing from the gist of the present disclosure. That is, the exemplary embodiments were disclosed only for illustrative purpose and were not intended to be understood as limitations. In order to determine the gist of the present disclosure, appended claims should be referred to.

In addition, the technique disclosed herein can be configured as follows.

(1) An information processing apparatus including: a data processing unit, on which a medium as an information storage apparatus is mounted, which controls reproduction of content stored on the medium, wherein the data processing unit executes host device ID registration processing for outputting a host device ID, which is an identifier of the host device itself, to the medium and storing the host device ID on the medium, receives the host device ID, which is stored on the medium, from the medium after execution of the host device ID registration processing, executes connection consistency confirmation processing for executing matching processing between the received host ID and the host device ID of the host device itself, and executes or continues content reproduction under a condition that the matching processing has been established in the connection consistency confirmation processing, or stops the content reproduction if the matching processing has not been established.

(2) The information processing apparatus according to (1), wherein the data processing unit generates a random number and transmits the random number to the medium in the connection consistency confirmation processing, receives the random number and a verification value for data including the host device ID, which has been stored on the medium, from the medium, confirms validity of received data from the medium based on the verification value, and then executes the matching processing.

(3) The information processing apparatus according to (2), wherein the verification value received from the medium is a Message Authentication Code (MAC), to which a session key (Bk) shared in authentication processing between the information processing apparatus and the medium is applied, and wherein the data processing unit calculates the generated random number and the MAC for the data which includes the host device ID received from the medium by applying the session key (Bk), determines whether or not the calculated MAC coincides with the MAC received from the medium, and confirms validity of the data received from the medium.

(4) The information processing apparatus according to any one of (1) to (3), wherein the data processing unit repeatedly executes the connection consistency confirmation processing during a period of reproducing the content stored on the medium, and continues the content reproduction under a condition that the matching processing has been established, or stops the content reproduction if the matching processing has not been established.

(5) The information processing apparatus according to any one of (1) to (4), wherein the data processing unit transmits a host device ID acquired from the device itself and a verification value generated based on the host device ID in the host device ID registration processing.

(6) The information processing apparatus according to (5), wherein the verification value is a Message Authentication Code (MAC), to which a session key (Bk) shared in authentication processing between the information processing apparatus and the medium is applied.

(7) The information processing apparatus according to any one of (1) to (6), wherein the data processing unit executes authentication processing with the medium, establishes an authentication session under a condition that the authentication processing and session key (Bk) sharing processing have been successfully performed, and then executes the host device ID registration processing or the connection consistency confirmation processing.

(8) An information storage apparatus including: a storage unit which stores content thereon; and a data processing unit which executes data processing on data received from and transmitted to a host device reproducing the content, wherein the data processing unit executes host device ID registration processing for inputting a host device ID, which is an identifier of the host device, from the host device, storing the host device ID on the storage unit, and registering the host device as an content reproduction permitted device, and after the execution of the host device ID registration processing, executes connection consistency confirmation processing for generating a verification value for data, which includes the host device ID stored on the storage unit, and transmitting the generated verification value and the host device ID to the host device.

(9) The information storage apparatus according to (8), wherein the data processing unit receives a random number from the host device and generates a verification value for the data which includes the received random number and the host device ID in the connection consistency confirmation processing.

(10) The information storage apparatus according to (8) or (9), wherein in the connection consistency confirmation processing, the data processing unit receives the host device ID and the verification value generated based on the host device ID from the host device, executes validity confirmation processing by applying the received verification value to the received host device ID, and stores the received host device ID on the storage unit under a condition that validity of the received host device ID has been confirmed.

(11) The information storage apparatus according to (10), wherein the verification value is a Message Authentication Code (MAC), to which a session key (Bk) shared in authentication processing between the information storage apparatus and the host device is applied.

(12) The information storage apparatus according to any one of (8) to (11), wherein the verification value generated in the connection consistency confirmation processing is a Message Authentication Code (MAC), to which a session key (Bk) shared in authentication processing between the host device and the information storage apparatus is applied, and wherein the data processing unit calculates a MAC for data, which includes the host device ID stored on the storage unit, by applying the session key (Bk) and transmits the MAC to the host device.

(13) The information storage apparatus according to any one of (8) to (12), wherein the data processing unit repeatedly executes the connection consistency confirmation processing during a period of reproducing the content by the host device.

(14) The information storage apparatus according to any one of (8) to (13), wherein the data processing unit executes authentication processing with the host device, establishes an authentication session under a condition that the authentication processing and session key (Bk) sharing processing have been successfully performed, and then executes the host device ID registration processing or the connection consistency confirmation processing.

(15) The information storage apparatus according to any one of (8) to (14), wherein the data processing unit executes deregistration processing for deleting the host device ID, which has been stored on the storage unit, in response to reception of a deregistration request from the host device.

(16) An information processing system including: a medium which stores content thereon; and a host device which reproduces the content, wherein the system executes host device ID registration processing in which the host device outputs a host device ID as an identifier of the host device itself to the medium and the medium stores the received host device ID on a storage unit and registers the host device as a content reproduction permitted device, executes connection consistency confirmation processing, in which the medium transmits the host device ID stored on the medium to the host device and the host device executes matching processing between the host device ID received from the medium and the host device ID maintained by the host device, after execution of the host device ID registration processing, and causes the host device to execute or continue content reproduction under a condition that the matching processing has been established in the connection consistency confirmation processing, or causes the host device to stop the content reproduction if the matching processing has not been established.

(17) An information processing method which is executed by an information processing apparatus, the information processing apparatus including a data processing unit, on which a medium as an information storage apparatus is mounted, which controls reproduction of content stored on the medium, the method including: causing the data processing unit to execute host device ID registration processing for outputting a host device ID, which is an identifier of the host device itself, to the medium and storing the host device ID on the medium; causing the data processing unit to execute connection consistency confirmation processing for receiving the host device ID stored on the medium and executing matching processing between the received host device ID and the host device ID of the host device itself after execution of the host device ID registration processing; and causing the data processing unit to execute or continue content reproduction under a condition that the matching processing has been established in the connection consistency confirmation processing, or stop the content reproduction if the matching processing has not been established.

(18) An information processing method which is executed by an information storage apparatus, the information storage apparatus including a storage unit which stores content thereon and a data processing unit which executes data processing on data received from and transmitted to a host device reproducing the content, the method including: causing the data processing unit to execute host device ID registration processing for inputting a host device ID, which is an identifier of the host device, from the host device, storing the host device ID on the storage unit, and registering the host device as a content reproduction permitted device; and causing the data processing unit to execute connection consistency confirmation processing for generating a verification value on data which includes the host device ID stored on the storage unit and transmitting the generated verification value and the host device ID stored on the storage unit to the host device after execution of the host device ID registration processing.

(19) A program which causes an information processing apparatus to execute information processing, the information processing apparatus including a data processing unit, on which a medium as an information storage apparatus is mounted, which controls reproduction of content stored on the medium, the information processing including: causing the data processing unit to execute host device ID registration processing for outputting a host device ID, which is an identifier of the host device itself, to the medium and storing the host device ID on the medium; causing the data processing unit to execute connection consistency confirmation processing for receiving the host device ID stored on the medium from the medium and executing matching processing between the received host device ID and the host device ID of the host device ID itself after execution of the host device ID registration processing; and causing the data processing unit to execute or continue content reproduction under a condition that the matching processing has been established in the connection consistency confirmation processing, or stop the content reproduction if the matching processing has not been established.

(20) A program which causes an information storage apparatus to execute information processing, the information storage apparatus including a storage unit which stores content thereon and a data processing unit which executes data processing on data received from and transmitted to a host device reproducing the content, the information processing including: causing the data processing unit to execute host device ID registration processing for inputting a host device ID, which is an identifier of the host device, from the host device, storing the host device ID on the storage unit, and registering the host device as a content reproduction permitted device: and causing the data processing unit to execute connection consistency confirmation processing for generating a verification value on data which includes the host device ID stored on the storage unit and transmitting the generated verification value and the host device ID stored on the storage unit to the host device after execution of the host device ID registration processing.

In addition, a series of processing described herein can be executed by hardware, software, or a composite configuration of both hardware and software. In a case of executing the processing by software, it is possible to execute the processing by installing a program recording the processing sequence in a memory in a computer embedded in dedicated hardware and executing the program or by installing the program in a general computer capable of executing various kinds of processing. For example, the program can be recorded in advance in a recording medium. The program can be installed from the recording medium to the computer or can be received via a network such as the Local Area Network (LAN) and the Internet and installed in a recording medium such as a built-in hard disk.

In addition, the various kinds of processing described herein may be executed not only in a time series manner in the order described above but also in parallel or in an individual manner in accordance with processing capability of the apparatus which executes the processing or in accordance with necessity. Moreover, the system described herein is a logical group configuration of a plurality of apparatuses and is not limited to the apparatuses with respective configurations in the same case body.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   one or more hardware processors configured to:
      execute host device ID registration processing for outputting a host device ID, which is an identifier of a host device that reproduces content stored in a medium, to the medium and storing the host device ID on the medium,
      receive the host device ID, which is stored on the medium, from the medium after execution of the host device ID registration processing, and execute connection consistency confirmation processing for executing matching processing between the received host ID and the host device ID of the host device itself, and
      execute or continue content reproduction under a condition that the matching processing has been established in the connection consistency confirmation processing, or stop the content reproduction if the matching processing has not been established.

2. The information processing apparatus according to claim 1,
   wherein the one or more hardware processors are further configured to:
      generate a random number and transmit the random number to the medium in the connection consistency confirmation processing,
      receive the random number and a verification value for data including the host device ID, which has been stored on the medium, from the medium, and
      confirm validity of received data from the medium based on the verification value, and then execute the matching processing.

3. The information processing apparatus according to claim 2,
   wherein the verification value received from the medium is a Message Authentication Code (MAC), to which a session key (Bk) shared in authentication processing between the information processing apparatus and the medium is applied, and
   wherein the one or more hardware processors are further configured to calculate the generated random number and the MAC for the data which includes the host device ID received from the medium by applying the session key (Bk), determine whether or not the calculated MAC coincides with the MAC received from the medium, and confirm validity of the data received from the medium.

4. The information processing apparatus according to claim 1, wherein the one or more hardware processors are further configured to repeatedly execute the connection consistency confirmation processing during a period of reproducing the content stored on the medium, and continue the content reproduction under a condition that the matching processing has been established, or stop the content reproduction if the matching processing has not been established.

5. The information processing apparatus according to claim 1, wherein the one or more hardware processors are further configured to transmit a host device ID acquired from the device itself and a verification value generated based on the host device ID in the host device ID registration processing.

6. The information processing apparatus according to claim 5, wherein the verification value is a Message Authentication Code (MAC), to which a session key (Bk) shared in authentication processing between the information processing apparatus and the medium is applied.

7. The information processing apparatus according to claim 1, wherein the one or more hardware processors are further configured to execute authentication processing with the medium, establish an authentication session under a condition that the authentication processing and session key (Bk) sharing processing have been successfully performed, and then execute the host device ID registration processing or the connection consistency confirmation processing.

8. An information storage apparatus comprising:
   a storage unit which stores content thereon; and
   one or more processors configured to:
      execute host device ID registration processing for inputting a host device ID, which is an identifier of a host device that reproduces content stored in a medium, from the host device, storing the host device ID on the storage unit, and registering the host device as a content reproduction permitted device, and
      execute connection consistency confirmation processing for generating a verification value for data, which includes the host device ID stored on the storage unit, and transmitting the generated verification value and the host device ID to the host device after the execution of the host device ID registration processing,
   wherein the host device ID transmitted from the storage unit is matched with the host device ID of the host device to execute content reproduction, and wherein the host device is configured to execute the content reproduction under a condition that the matching processing has been established in the connection consistency confirmation processing.

9. The information storage apparatus according to claim 8, wherein the one or more processors are further configured to receive a random number from the host device and generate a verification value for the data which includes the received random number and the host device ID in the connection consistency confirmation processing.

10. The information storage apparatus according to claim 8, wherein, in the host device ID registration processing, the one or more processors are further configured to:
receive the host device ID and the verification value generated based on the host device ID from the host device, and
execute validity confirmation processing by applying the received verification value to the received host device ID, and store the received host device ID on the storage unit under a condition that validity of the received host device ID has been confirmed.

11. The information storage apparatus according to claim 10, wherein the verification value is a Message Authentication Code (MAC), to which a session key (Bk) shared in authentication processing between the information storage apparatus and the host device is applied.

12. The information storage apparatus according to claim 8,
wherein the verification value generated in the connection consistency confirmation processing is a Message Authentication Code (MAC), to which a session key (Bk) shared in authentication processing between the host device and the information storage apparatus is applied, and
wherein the one or more processors are further configured to calculate a MAC for data, which includes the host device ID stored on the storage unit, by applying the session key (Bk) and transmits the MAC to the host device.

13. The information storage apparatus according to claim 8, wherein the one or more processors are further configured to repeatedly execute the connection consistency confirmation processing during a period of reproducing the content by the host device.

14. The information storage apparatus according to claim 8, wherein the one or more processors are further configured to execute authentication processing with the host device, establish an authentication session under a condition that the authentication processing and session key (Bk) sharing processing have been successfully performed, and then execute the host device ID registration processing or the connection consistency confirmation processing.

15. The information storage apparatus according to claim 8, wherein the one or more processors are further configured to execute deregistration processing for deleting the host device ID, which has been stored on the storage unit, in response to reception of a deregistration request from the host device.

16. An information processing system comprising:
a medium which stores content thereon; and
a host device which reproduces the content,
wherein one or more processors of the host device are configured to:
execute host device ID registration processing in which the host device outputs a host device ID as an identifier of the host device itself to the medium and the medium stores the received host device ID on a storage unit and registers the host device as a content reproduction permitted device,
execute connection consistency confirmation processing, in which the medium transmits the host device ID stored on the medium to the host device and execute matching processing between the host device ID received from the medium and the host device ID maintained by the host device, after execution of the host device ID registration processing, and
cause the host device to execute or continue content reproduction under a condition that the matching processing has been established in the connection consistency confirmation processing, or cause the host device to stop the content reproduction if the matching processing has not been established.

17. An information processing method which is executed by a computing device, wherein the computing device comprises one or more hardware processors, the method comprising:
executing, by the one or more hardware processors, host device ID registration processing for outputting a host device ID, which is an identifier of a host device that reproduces content stored in a medium, to the medium and storing the host device ID on the medium;
executing, by the one or more hardware processors, connection consistency confirmation processing for receiving the host device ID stored on the medium from the medium and executing matching processing between the received host device ID and the host device ID of the host device itself after execution of the host device ID registration processing; and
executing or continuing, by the one or more hardware processors, content reproduction under a condition that the matching processing has been established in the connection consistency confirmation processing, or stopping the content reproduction if the matching processing has not been established.

18. An information processing method which is executed by an information storage apparatus, the information storage apparatus including a storage unit which stores content thereon and one or more processors, the method comprising:
executing, by the one or more processors, host device ID registration processing for inputting a host device ID, which is an identifier of a host device that reproduces content stored in a medium, from the host device, storing the host device ID on the storage unit, and registering the host device as a content reproduction permitted device; and
executing, by the one or more processors, connection consistency confirmation processing for generating a verification value on data which includes the host device ID stored on the storage unit and transmitting the generated verification value and the host device ID stored on the storage unit to the host device after execution of the host device ID registration processing,
wherein the host device ID transmitted from the storage unit is matched with the host device ID of the host device to execute content reproduction, and wherein the host device is configured to execute the content reproduction under a condition that the matching processing has been established in the connection consistency confirmation processing.

19. A non-transitory computer-readable medium having stored thereon a set of computer-executable instructions for causing the computer to perform steps comprising:
executing host device ID registration processing for outputting a host device ID, which is an identifier of a host device that reproduces content stored in a medium, to the medium and storing the host device ID on the medium;

executing connection consistency confirmation processing for receiving the host device ID stored on the medium from the medium and executing matching processing between the received host device ID and the host device ID of the host device itself after execution of the host device ID registration processing; and executing or continuing content reproduction under a condition that the matching processing has been established in the connection consistency confirmation processing, or stopping the content reproduction if the matching processing has not been established.

20. A non-transitory computer-readable medium having stored thereon a set of computer-executable instructions for causing the computer to perform steps comprising:

executing host device ID registration processing for inputting a host device ID, which is an identifier of a host device that reproduces content stored in a medium, from the host device, storing the host device ID on the storage unit, and registering the host device as a content reproduction permitted device; and executing connection consistency confirmation processing for generating a verification value on data which includes the host device ID stored on the storage unit and transmitting the generated verification value and the host device ID stored on the storage unit to the host device after execution of the host device ID registration processing, wherein the host device ID transmitted from the storage unit is matched with the host device ID of the host device to execute content reproduction, and wherein the host device is configured to execute the content reproduction under a condition that the matching processing has been established in the connection consistency confirmation processing.

* * * * *